United States Patent
Anma et al.

(10) Patent No.: US 10,144,446 B2
(45) Date of Patent: Dec. 4, 2018

(54) VEHICLE AND METHOD FOR CONTROLLING VEHICLE

(71) Applicant: FUJI JUKOGYO KABUSHIKI KAISHA, Tokyo (JP)

(72) Inventors: Yoshisada Anma, Tokyo (JP); Takeshi Torii, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/238,432

(22) Filed: Aug. 16, 2016

(65) Prior Publication Data

US 2017/0057540 A1 Mar. 2, 2017

(30) Foreign Application Priority Data

Aug. 27, 2015 (JP) .................................. 2015-167958

(51) Int. Cl.
*B62D 5/04* (2006.01)
*B62D 6/00* (2006.01)

(52) U.S. Cl.
CPC .......... *B62D 5/0463* (2013.01); *B62D 6/003* (2013.01); *B60Y 2300/022* (2013.01)

(58) Field of Classification Search
None
See application file for complete search history.

(56) References Cited

U.S. PATENT DOCUMENTS

| 2004/0193345 A1* | 9/2004 | Chen | B62D 6/003 |
| | | | 701/42 |
| 2008/0114511 A1* | 5/2008 | Sakugawa | B60T 8/1755 |
| | | | 701/41 |

FOREIGN PATENT DOCUMENTS

| JP | 2009-126186 A | 6/2009 |
| JP | 2012-210832 A | 11/2012 |
| JP | 2013-103664 A | 5/2013 |
| JP | 2014-141174 A | 8/2014 |
| JP | 2015-003697 A | 1/2015 |

OTHER PUBLICATIONS

Office Action received for Japanese Patent application No. 2015-167958, dated Oct. 4, 2016, 3 pages of office action including 2 pages of English translation.

* cited by examiner

*Primary Examiner* — Tamara L Weber
(74) *Attorney, Agent, or Firm* — Chip Law Group

(57) ABSTRACT

An apparatus for controlling a vehicle includes a power steering adjuster that adjusts an amount of an assistance in a steering to be provided by a power steering in accordance with a change in a state quantity related to an ease of a steering, and a steering stability controller that controls a control amount to perform a driving force control on a wheel of a vehicle in accordance with the change in the state quantity.

15 Claims, 27 Drawing Sheets

PATTERN REPRESENTING
SMOOTH STEERING

FIG. 8
PATTERN REPRESENTING SMOOTH STEERING
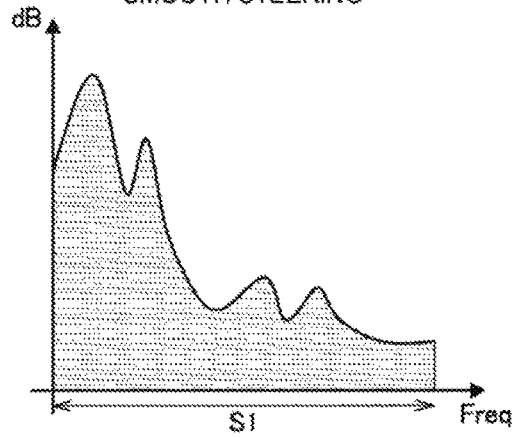
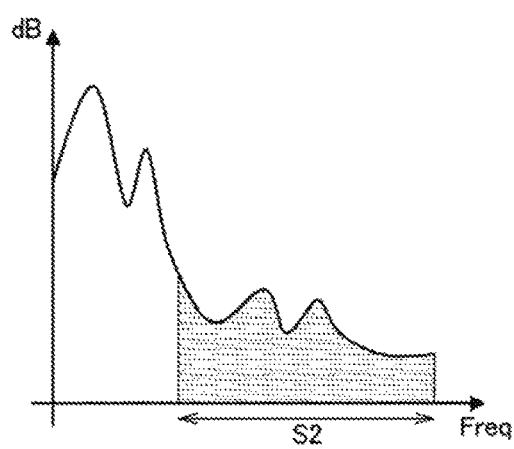
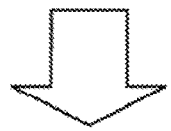
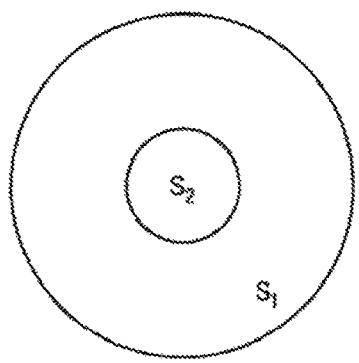
$$S_r = \frac{S_2}{S_1}$$

PATTERN REPRESENTING STEERING WHICH IS NOT SMOOTH

FIG. 25
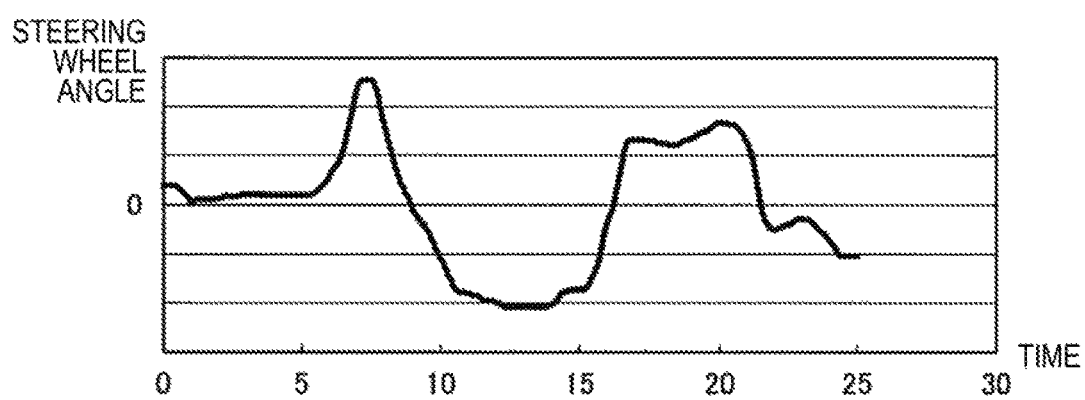
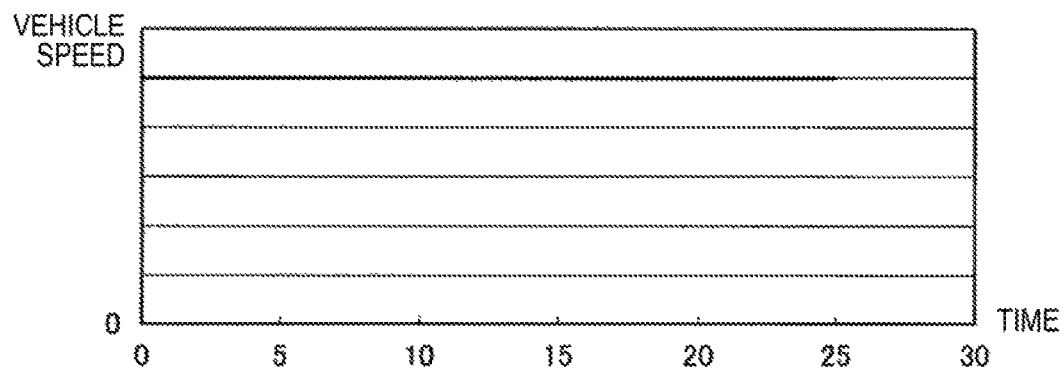

FIG. 26
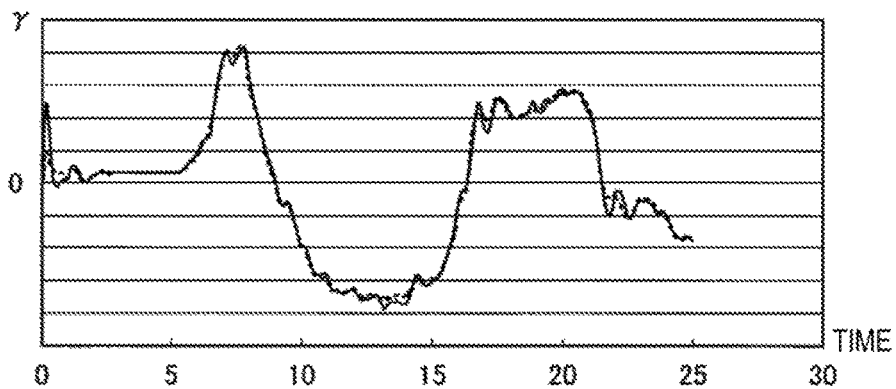
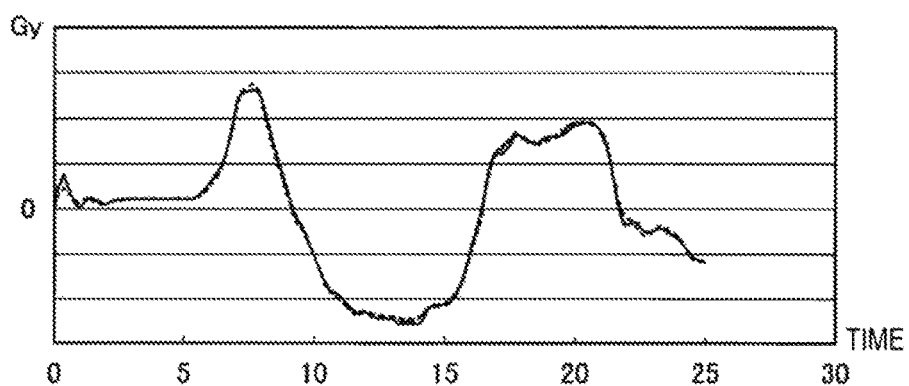
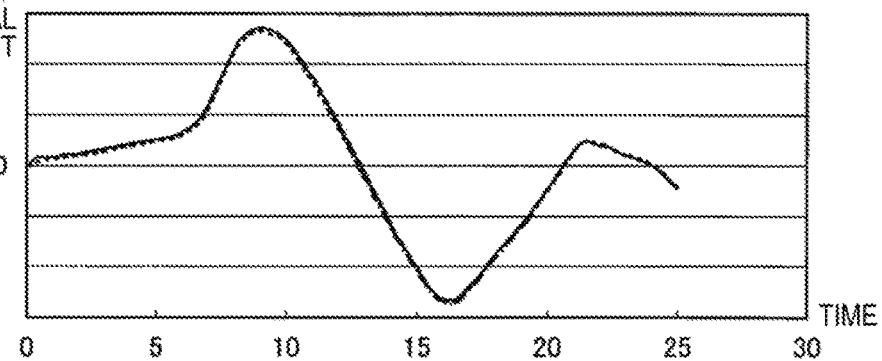

FIG.27

| <ITEMS> | COMPARATIVE EXAMPLES | | PRESENT IMPLEMENTATION CHARACTERISTIC REPRESENTED BY SOLID LINE |
| --- | --- | --- | --- |
| | COMPARATIVE EXAMPLE 1 CHARACTERISTIC REPRESENTED BY DOT-DASHED LINE | COMPARATIVE EXAMPLE 2 CHARACTERISTIC REPRESENTED BY BROKEN LINE | |
| STEERING WHEEL TORQUE: SUM OF TORQUE INPUTTED BY DRIVER AND ASSIST TORQUE | NORMAL | REDUCED (MADE HEAVIER) | REDUCED (MADE HEAVIER) |
| CONTROL BY STEERING STABILITY CONTROLLER: CONTROL AMOUNT FOR GIVEN STEERING WHEEL ANGLE | NORMAL | NORMAL | INCREASED |
| STEERING ANGLE: TIRE STEERING ANGLE FOR GIVEN STEERING FORCE | NORMAL | REDUCED | REDUCED |
| AMOUNT OF TURN: AMOUNT OF TURN DETERMINED BY STEERING WHEEL ANGLE AND TV CONTROL AMOUNT | NORMAL | REDUCED | MAINTAINED |

VEHICLE AND METHOD FOR CONTROLLING VEHICLE

CROSS REFERENCE TO RELATED APPLICATIONS

This application claims priority benefit of Japanese Patent Application No. JP 2015-167958 filed in the Japan Patent Office on Aug. 27, 2015 the contents of which is hereby incorporated herein by reference in its entirety.

BACKGROUND

1. Technical Field

The present invention relates to an apparatus and a method for controlling a vehicle.

2. Related Art

Japanese Unexamined Patent Application Publication (JP-A) No. 2009-126186, for example, discloses a technique, adopted in an electric power steering apparatus of a vehicle, of performing a correction of increasing a steering angle characteristic when the steering frequency is in a range lower than or equal to a predetermined value and of reducing the steering angle characteristic when the steering frequency is in a range higher than or equal to the predetermined value, to prevent a deterioration in a steering feeling while reducing a deterioration in vehicle response.

In addition, JP-A No. 2013-103664 discloses a technique, adopted in an electric power steering control apparatus of a vehicle, of correcting the amount of assistance such that a gain characteristic for an assist correction amount is gradually decreased if the frequency of steering wheel torque exceeds a first set value, and the gain characteristic for the assist correction amount is gradually increased if the frequency of an estimated road surface reaction force exceeds a second set value, to reduce rolling vibrations while preventing a reduction in yaw response of the vehicle.

Further, JP-A No. 2014-141174 describes control of applying a control target torque, which amounts to a basic assist torque minus a torque corresponding to viscosity in steering, in electric power steering (EPS) control for lane keep assist, to achieve an improved steering feeling and reduced driver fatigue. JP-A No. 2014-141174 describes a function of increasing a viscous torque as a yaw rate difference approaches 0, a function of decreasing the viscous torque as a vehicle speed increases, and a function of calculating the viscous torque in accordance with an angular velocity of a steering wheel.

Furthermore, JP-A No. 2012-210832 describes a technique of performing braking/driving force control using a difference between a target stability factor and an actual stability factor.

However, the technique described in JP-A No. 2009-126186 mentioned above has a problem in that, as the frequency related to steering increases, the amount of control on the steering decreases, which results in a reduction in turning performance of the vehicle. This may cause a discrepancy between the steering by a driver and a turn of the vehicle, which may lead to a failure to cause the vehicle to make a turn along a driving course as intended by the driver. Accordingly, there has been a demand for a technique for compensating for reduced turning performance of the vehicle in accordance with an increase in the frequency related to the steering.

Further, according to the technique described in JP-A No. 2014-141174 mentioned above, the viscous torque is increased when the vehicle is traveling straight ahead, and when control on the steering is lost because of an uneven road surface when the vehicle is traveling on a rough road, a self aligning torque which may be caused by the loss of the control on the steering can be easily reduced. However, when the vehicle is traveling straight ahead at a high speed, the viscous torque is reduced, and if a loss of control on the steering is caused by an uneven road surface, and a self aligning torque that is so great as to cancel lane keep assist control occurs, the control may be terminated at a time at which the driver does not expect the control to be finished, which may lead to an uncomfortable feeling of the driver and unstable behavior of the vehicle. Further, because the control is performed with the steering alone, a response characteristic of the vehicle with respect to the amount of a steering operation cannot be changed, and the response characteristic of the vehicle with respect to the steering (i.e., the phase of a yaw with respect to the steering) cannot be controlled. Furthermore, turn assist control or control to improve stability performance cannot be selectively performed depending on whether the road surface on which the vehicle is traveling is in a high $\mu$ condition or a low $\mu$ condition. Furthermore, when the steering wheel is operated when the vehicle is traveling at a low speed on a low $\mu$ road surface, the behavior of the vehicle can be easily stabilized because of an increased viscous torque, but when the steering wheel is operated when the vehicle is traveling at a high speed on a low $\mu$ road surface, the reduced viscous torque may cause an unintended excessive turn of the vehicle and a reduction in the stability performance of the vehicle.

Furthermore, according to the technique described in JP-A No. 2012-210832 mentioned above, a control amount is calculated based on the target value and actual value (i.e., calculated value) of the stability factor for motor driving, and therefore, the function that can be accomplished by this technique is similar to that of known yaw rate feedback control due to limitations of vehicle motion control, and this technique does not allow a characteristic (i.e., a target value) of the stability factor to change in accordance with the driving condition. Therefore, only one of turn assist and stability performance of the vehicle can be emphasized, and control to reduce shaky steerings is not performed, and therefore, when corrections in steering are repetitively performed on a low $\mu$ road surface, for example, a reduction in the stability performance of the vehicle may occur.

SUMMARY OF THE INVENTION

It is desirable to provide a novel and improved apparatus and method for controlling a vehicle which are able to optimally control the behavior of the vehicle in accordance with steering inputs by a driver of the vehicle.

An aspect of the present invention provides an apparatus for controlling a vehicle, the apparatus including: a power steering adjuster that adjusts an amount of an assistance in a steering to be provided by a power steering in accordance with a change in a state quantity related to an ease of a steering; and a steering stability controller that controls a control amount to perform a driving force control on a wheel of a vehicle in accordance with the change in the state quantity.

The state quantity may be frequency-related data related to a steering input by a driver of the vehicle.

The frequency-related data may be data obtained from a change in one of a rate of a change in a steering wheel torque caused by the driver and a rate of a change in an amount of a steering operation by the driver as a result of subjecting one of the steering wheel torque and the amount of the steering operation by the driver to a frequency analysis.

The power steering adjuster may cause the amount of an assistance to decrease as high-frequency components included in the frequency-related data increase.

The power steering adjuster may include a calculator that calculates a reference value of a front wheel steering angle and the steering wheel torque based on a steering model, a frequency-related data calculator that subjects one of the steering wheel torque and the amount of the steering operation by the driver to the frequency analysis to calculate the frequency-related data, or calculates the frequency-related data from one of the change in the rate of a change in the steering wheel torque and the change in the rate of a change in the amount of the steering operation, a steering correction gain calculator that calculates a steering correction gain for correcting the reference value of the front wheel steering angle based on the frequency-related data, and a steering assist amount adjuster that multiplies the reference value of the front wheel steering angle by the steering correction gain to calculate a requested value of the front wheel steering angle to be outputted to a power steering mechanism.

The frequency-related data calculator may calculate the frequency-related data based on a ratio between a first area obtained by performing an integration of a waveform resulting from a frequency analysis and a second area obtained by performing an integration of a portion of the waveform over a range greater than or equal to a predetermined frequency range.

The steering stability controller may include a target yaw rate calculator that calculates a target yaw rate of the vehicle based on a vehicle model that defines a relationship between the target yaw rate of the vehicle and a vehicle speed and a steering wheel angle with a target stability factor determined from specifications of the vehicle, and a corrector that varies the target stability factor to compensate for a reduction in an amount of a turn caused by a control of the power steering, when the frequency-related data include a high-frequency component.

The target yaw rate calculator may cause the target yaw rate to increase as a value of the target stability factor decreases.

The apparatus for controlling a vehicle may further include: a feedback yaw rate acquirer that acquires, as a yaw rate generated by the vehicle, a feedback yaw rate to be compared with the target yaw rate; and a control target yaw moment calculator that calculates a control target yaw moment based on a difference between the target yaw rate and the feedback yaw rate. The control target yaw moment calculator may calculate the control target yaw moment by adding up a steady-state damping control yaw moment calculated based on the difference and a transient inertia compensation yaw moment calculated based on the difference, and may correct one of the damping control yaw moment and the inertia compensation yaw moment based on the frequency-related data.

The control target yaw moment calculator may cause a value of the inertia compensation yaw moment to decrease as high-frequency components included in the frequency-related data increase.

The feedback yaw rate acquirer may acquire a first yaw rate obtained from a vehicle model and a second yaw rate obtained from a yaw rate sensor, and may calculate the feedback yaw rate based on the first and second yaw rates with an increased distribution of the first yaw rate when a difference between the first and second yaw rates is small and an increased distribution of the second yaw rate when the difference is large.

An another aspect of the present invention provides a method for controlling a vehicle, the method including: adjusting an amount of an assistance in a steering to be provided by a power steering in accordance with a change in a state quantity related to an ease of a steering; and controlling a control amount to perform a driving force control on a wheel of a vehicle in accordance with the change in the state quantity.

BRIEF DESCRIPTION OF THE DRAWINGS

FIG. 8 is a schematic diagram illustrating an example case where a ratio Sr between an area S1 represented by a waveform resulting from the frequency analysis and an area S2 represented by a portion of the waveform over a range greater than or equal to a predetermined frequency range (TH_FREQ) is used as the frequency-related data related to the steering;

FIG. 25 is a schematic diagram for explaining control amounts and vehicle behaviors when control according to an implementation of the present invention is performed;

FIG. 26 is a schematic diagram for explaining control amounts and vehicle behaviors when control according to an implementation of the present invention is performed;

FIG. 27 is a schematic diagram illustrating the steering wheel torque, the amount of motor control by a steering stability controller, a steering angle, and the amount of a turn of the vehicle with respect to each of an implementation of the present invention, comparative example 1, and comparative example 2 for comparison therebetween.

DETAILED DESCRIPTION

Figure 1:
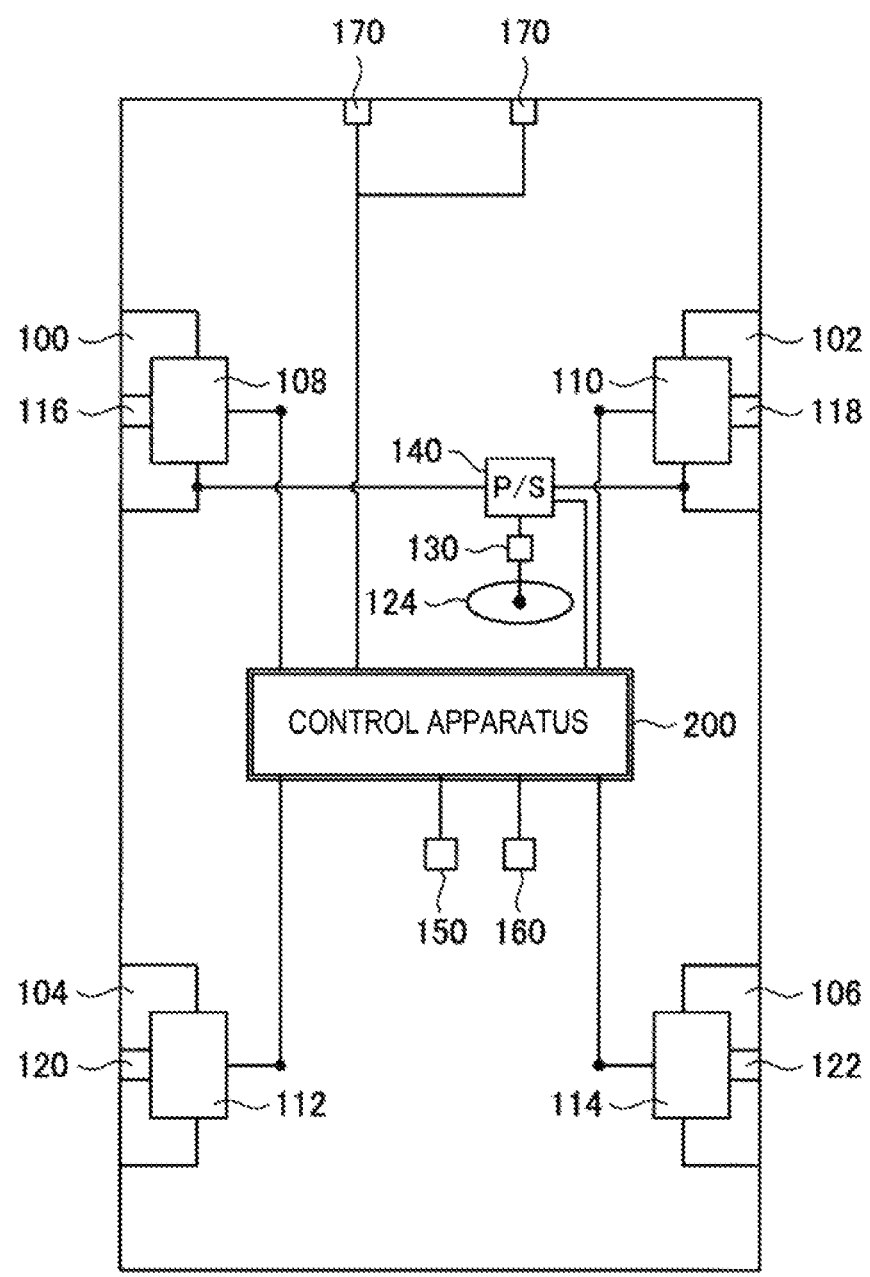
FIG. 1 is a schematic diagram illustrating a vehicle according to an implementation of the present invention.

Hereinafter, preferred implementations of the present invention will be described in detail with reference to the appended drawings. Note that, in this specification and the appended drawings, structural elements that have substantially the same function and structure are denoted with the same reference numerals, and repeated description of these structural elements is omitted.

1. Example Structure of Vehicle

First, with reference to FIG. 1, the structure of a vehicle 1000 according to an implementation of the present invention will be described below. FIG. 1 is a schematic diagram illustrating the vehicle 1000 according to the present implementation. As illustrated in FIG. 1, the vehicle 1000 includes front wheels 100 and 102; rear wheels 104 and 106; driving force generators (i.e., motors) 108, 110, 112, and 114 that drive the front wheels 100 and 102 and the rear wheels 104 and 106, respectively; wheel speed sensors 116, 118, 120, and 122 that measure the wheel speeds of the front wheels 100 and 102 and the rear wheels 104 and 106, respectively; a steering wheel 124; a steering wheel angle sensor 130; a power steering mechanism 140; a yaw rate sensor 150; an acceleration sensor 160; outside recognizers 170; and a control apparatus (i.e., a controller) 200.

The vehicle 1000 according to the present implementation is equipped with the motors 108, 110, 112, and 114 to drive the front wheels 100 and 102 and the rear wheels 104 and 106, respectively. This allows a driving torque for each of the front wheels 100 and 102 and the rear wheels 104 and 106 to be controlled. Therefore, each of the front wheels 100 and 102 and the rear wheels 104 and 106 can be driven to generate a yaw rate through torque vectoring control independently of generation of a yaw rate by steering of the front wheels 100 and 102. In particular, in the present implementation, the torques applied to the rear wheels 104 and 106 are controlled individually to generate a yaw rate independently of a steering system. The motors 112 and 114 for the respective rear wheels 104 and 106 are controlled based on instructions from the control apparatus 200 to control the driving torques applied to the rear wheels 104 and 106.

The power steering mechanism 140 controls the steering angles of the front wheels 100 and 102 through torque control or angle control in accordance with an operation of the steering wheel 124 by a driver. The steering wheel angle sensor 130 measures a steering angle $\theta h$ inputted by the driver operating the steering wheel 124. The yaw rate sensor 150 measures an actual yaw rate $\gamma$ of the vehicle 1000. The wheel speed sensors 116, 118, 120, and 122 measure the vehicle speed V of the vehicle 1000.

Note that the present invention is not limited to the above implementation, and that a vehicle according to another implementation of the present invention may be designed so that only the rear wheels 104 and 106 can generate driving forces independently with the motors 112 and 114 without the motors 108 and 102 that drive the front wheels 100 and 110. Also note that the present invention is not limited to the torque vectoring control with driving force control, and that another implementation of the present invention may be applied to, for example, a four-wheel steering system in which the steering angles of the rear wheels are controlled.

Figure 2:
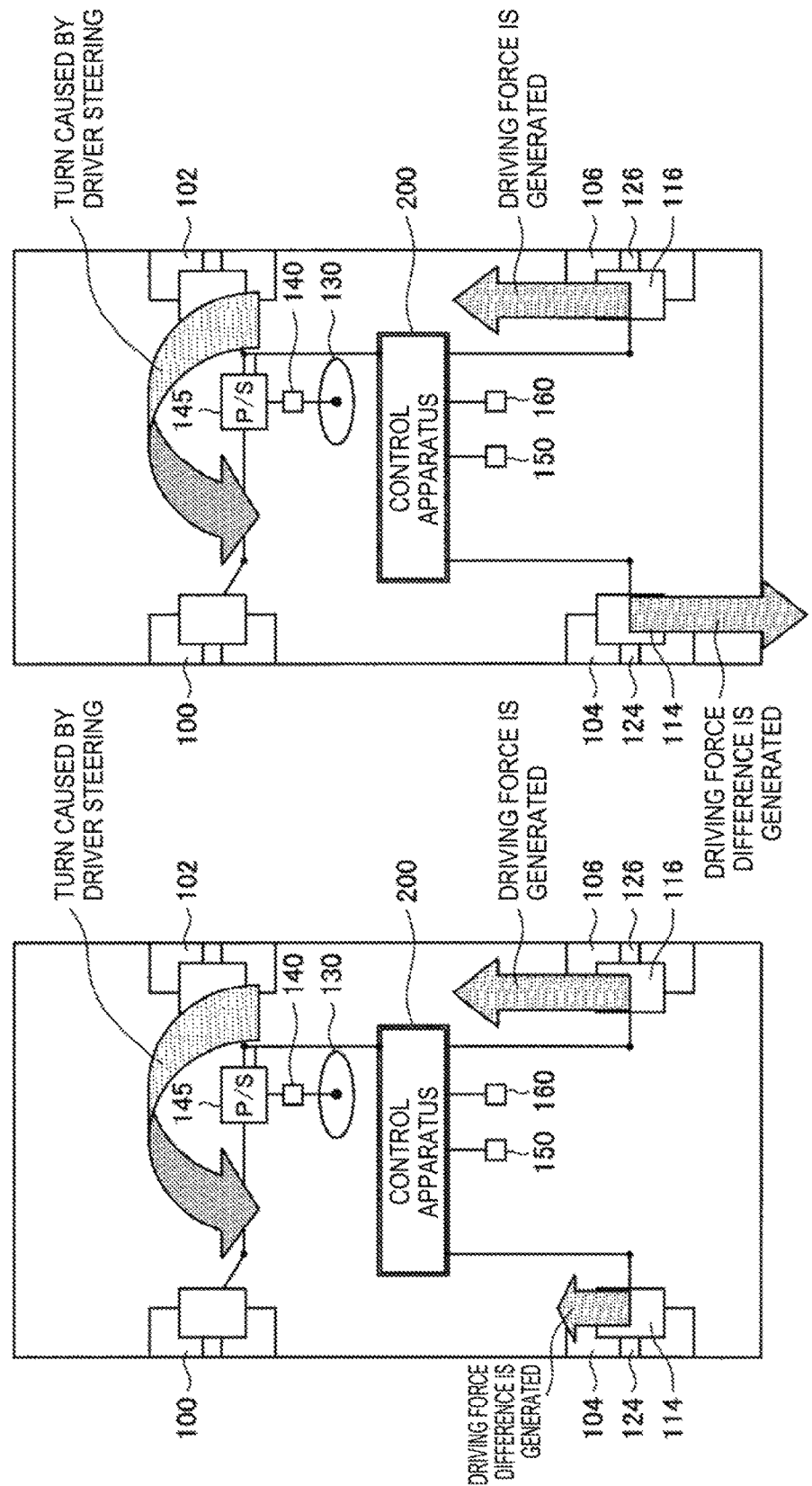
FIG. 2 is a schematic diagram illustrating turn control performed by the vehicle according to an implementation of the present invention.

FIG. 2 is a schematic diagram illustrating turn control performed by the vehicle 1000 according to the present implementation, and is a schematic diagram illustrating turn control by steering (i.e., steering stability control). In the turn control by the steering, the tire steering angles of the front wheels 100 and 102 are varied in accordance with an operation of the steering wheel 124 by the driver, so that the vehicle 1000 makes a turn. In addition, in the turn control by the steering, a difference between the driving forces for the rear wheels 104 and 106 is caused to provide assistance in the turn of the vehicle 1000. In the example illustrated in FIG. 2, the vehicle 1000 is turning to the left in accordance with a steering by the driver (or an operator). In addition, a difference between the driving forces for the rear wheels 104 and 106 is caused to produce a forward driving force for the right rear wheel 106, and cause a reduction in the driving force for the left rear wheel 104 compared to the driving force for the right rear wheel 106, or produce a rearward driving force for the left rear wheel 104. A difference between the driving forces for the left and right sides is thus caused to generate a yaw moment to provide assistance in the left turn.

In the present implementation, the amount of steering caused by steering control and a target stability factor used in control of the motor driving forces are adjusted based on a parameter related to the frequency of inputs, such as operations of the steering wheel, made by the driver into the vehicle 1000, and thus, influence of a high-frequency component due to a road surface input or a hunting at the time of a turn is reduced to accomplish smooth steering while maintaining steering control through power steering and the amount of turn assist that accompanies vehicle braking/driving force control through the motors. In the present implementation, a steering wheel torque and its frequency are calculated based on a steering model, and a control constant for the power steering and a control constant for motor control of the steering stability control are varied based on the steering wheel torque and its frequency. Details thereof will be described below.

2. Example Structure of Control Apparatus

Figure 3:
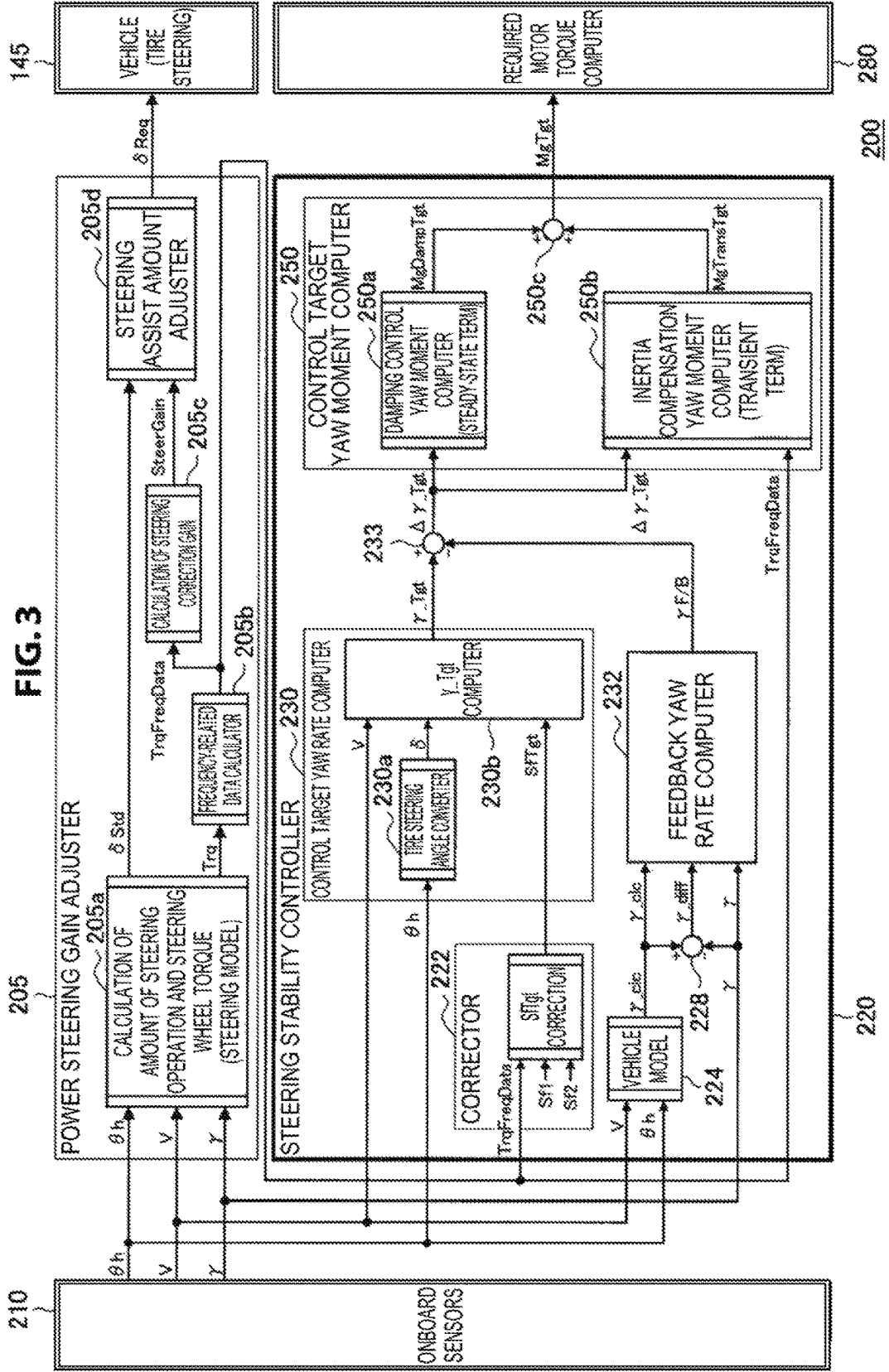
FIG. 3 is a schematic diagram illustrating the structure of a control apparatus.

FIG. 3 is a schematic diagram illustrating the structure of the control apparatus 200. The control apparatus 200 includes onboard sensors 210, a power steering gain adjuster 205, a steering stability controller 220, and a required motor torque computer 280.

The power steering gain adjuster 205 includes a steering model 205a, a frequency-related data calculator 205b, a steering correction gain calculator 205c, and a steering assist amount adjuster 205d.

The steering stability controller 220 includes a corrector 222, a vehicle model 224, a subtractor 228, a control target yaw rate computer 230, a feedback yaw rate computer (i.e., a feedback yaw rate acquirer) 232, a subtractor 233, and a control target yaw moment computer (i.e., a control target yaw moment calculator) 250. In addition, the control target yaw rate computer 230 includes a tire steering angle converter 230a and a γ_Tgt computer 230b. In addition, the control target yaw moment computer 250 includes a damping control yaw moment computer 250a, an inertia compensation yaw moment computer 250b, and an adder 250c. In one implementation, the control target yaw rate computer 230 may serve as a "target yaw rate calculator". In one implementation, the feedback yaw rate computer 232 may serve as a "feedback yaw rate acquirer". In one implementation, the control target yaw moment computer 250 may serve as a "control target yaw moment calculator".

Figure 4:
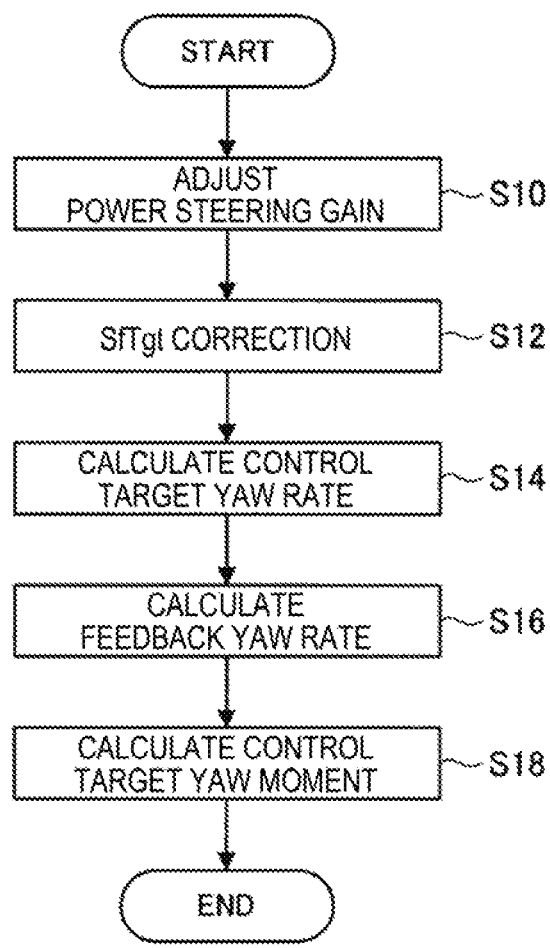
FIG. 4 is a flowchart illustrating a basic procedure performed in an implementation of the present invention.

FIG. 4 is a flowchart illustrating a basic procedure performed in the present implementation. First, at step S10, the power steering gain adjuster 205 adjusts a gain for the power steering. At next step S12, the corrector 222 corrects a target stability factor SfTgt. At next step S14, the control target yaw rate computer 230 calculates a control target yaw rate γ_Tgt based on the target stability factor SfTgt. At next step S16, the feedback yaw rate computer 232 calculates a feedback yaw rate γF/B. At next step S18, the control target yaw moment computer 250 calculates a control target yaw moment MgTgt based on a difference Δγ_Tgt (i.e., an amount of yaw rate correction) between the control target yaw rate γ_Tgt and the feedback yaw rate γF/B.

Figure 5:
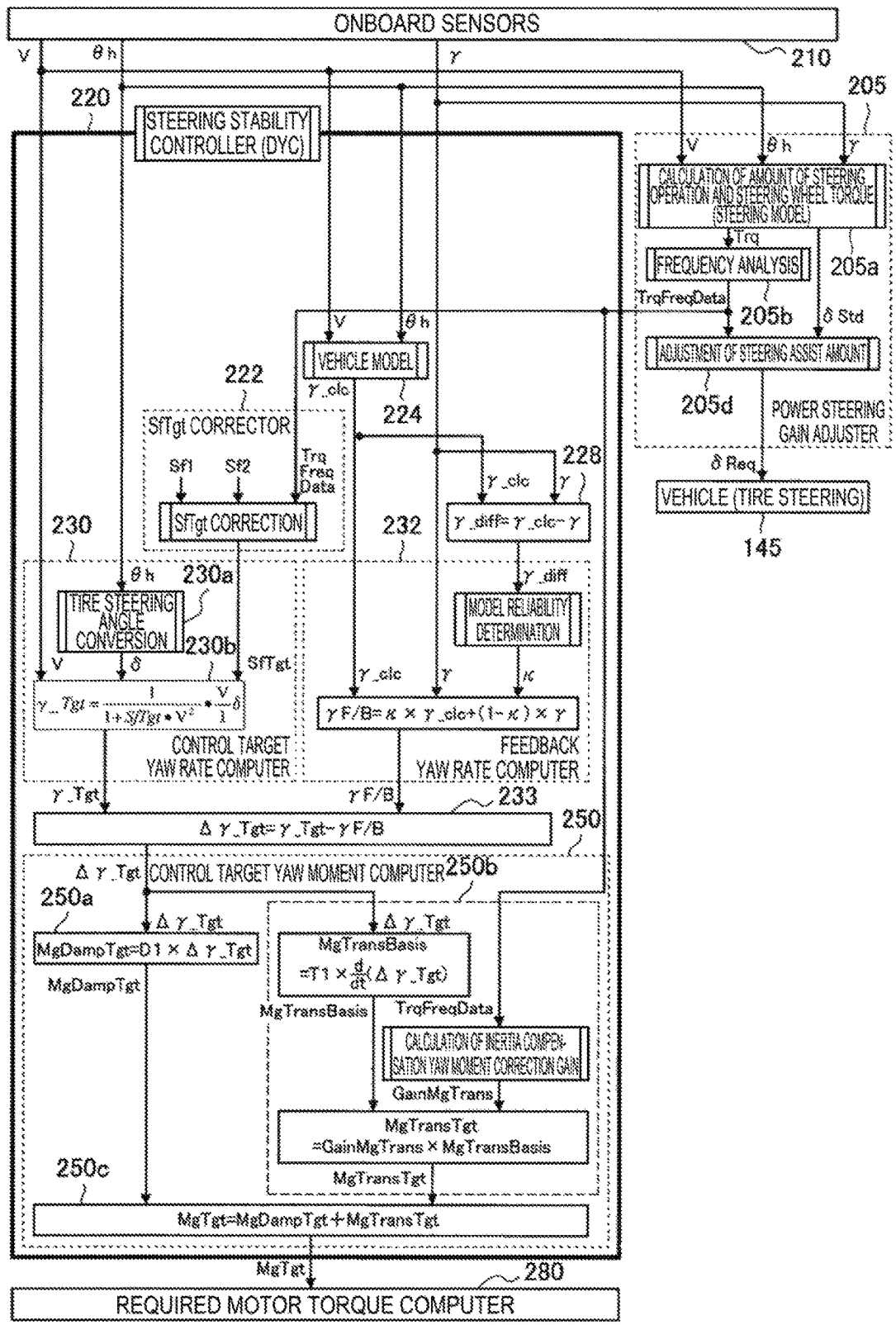
FIG. 5 is a schematic diagram for explaining processes performed by the control apparatus.

FIG. 5 is a schematic diagram for explaining processes performed by the control apparatus 200. Note that FIG. 5 illustrates the structural elements of the control apparatus 200 as does FIG. 3, and additionally illustrates processes performed by the various structural elements in detail. Hereinafter, the processes performed by the control apparatus 200 will be described based on FIGS. 3 to 5. The onboard sensors 210 include the steering wheel angle sensor 130, the yaw rate sensor 150, the acceleration sensor 160, and the wheel speed sensors 116, 118, 120, and 122, all of which have been mentioned above.

3. Structure of Power Steering Gain Adjuster

The power steering gain adjuster 205 adjusts the amount of assistance to be provided by the power steering mechanism 140 in accordance with a change in a state quantity related to ease of steering. Examples of state quantities related to the ease of steering include the steering wheel torque and the angular velocity of the steering wheel. If a high-frequency component is detected from the state quantity related to the ease of steering, it means that a hunting has occurred in the operation of the steering wheel, or that the operation of the steering wheel is shaky, for example. Accordingly, the amount of assistance in steering is varied in accordance with a change in data related to the frequency to reduce vibrations of the steering system that accompany steering wheel inputs and resulting vibrations of the vehicle.

For example, the steering model 205a according to an example implementation of the present invention is a steering model that uses a steering wheel angle θh, a vehicle speed V, and a yaw rate γ as inputs, and a reference value (δStd) of a steering angle and the steering wheel torque (Trq) are calculated from the steering model 205a.

More specifically, in the steering model 205a, a steering wheel torque Th and a front wheel steering angle δ resulting from an operation of the steering wheel by the driver are calculated in accordance with Eqs. (1) and (2) below. Note that a steering wheel angle α is a value obtained by converting the steering wheel angle θh, which is measured by the steering wheel angle sensor 130, to a value corresponding to a kingpin.

$$I_h \frac{d^2\alpha}{dt^2} + C_h \frac{d\alpha}{dt} + K_h(\alpha - \delta) = T_h \tag{1}$$

$$I_s \frac{d^2\delta}{dt^2} + C_s \frac{d\delta}{dt} + K_s(\delta - \alpha) = 2\xi K_f \left(\beta + \frac{l_f}{V}\gamma - \delta\right) \tag{2}$$

The variables and constants in Eqs. (1) and (2) are as follows.

Ih: a yaw moment of inertia about a kingpin (corresponding to a yaw moment of inertia of the steering wheel)
Ch: a viscous friction coefficient of a steering shaft
Cs: a viscous friction coefficient about the kingpin
Ks: an equivalent elastic modulus about the kingpin
Th: the steering wheel torque applied by the driver
ξ: a pneumatic trail
α: the steering wheel angle (as converted to the value corresponding to the kingpin)
δ: the front wheel steering angle (i.e., a tire steering angle)
V: the vehicle speed
β: a vehicle side slip angle
γ: the yaw rate (=γ_clc)
lf: the distance between the center of gravity of the vehicle and a front wheel center
Kf: cornering power Note that, hereinafter, the front wheel steering angle δ calculated from Eqs. (1) and (2) is used as the reference value (δStd) of the steering angle.

Meanwhile, in order to ensure sufficient responsivity at the time of control, the frequency-related data calculator 205b subjects the steering wheel torque calculated from the steering model 205a to a frequency analysis, thus converting the steering wheel torque to frequency data. In the present implementation, the steering wheel torque is subjected to an FFT analysis using a known method, and resulting data are calculated as frequency-related data (TrqFreqData) related to a steering input by the driver. The frequency-related data (TrqFreqData) related to the steering correspond to the state quantity related to the ease of steering, and the condition of the steering by the driver can be judged based on the frequency-related data (TrqFreqData). The frequency-related data (TrqFreqData) related to the steering are used as an indicator for varying a control constant for the power steering by the power steering gain adjuster 205, and a control constant for the braking/driving force control by the steering stability controller 220.

Figure 6:
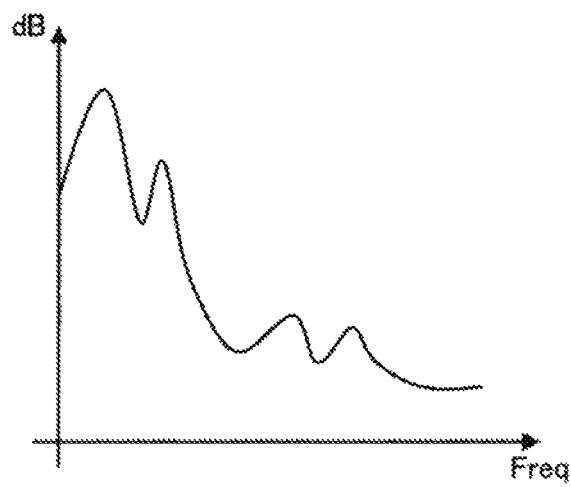
FIG. 6 is a characteristic diagram illustrating a result of an FFT analysis of a steering wheel torque as frequency-related data related to steering.
Figure 7:
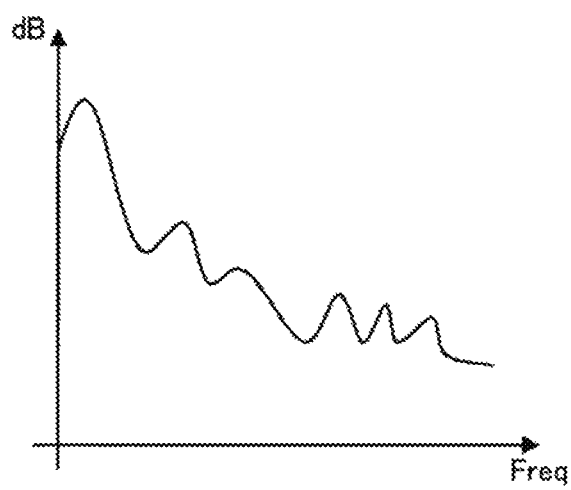
FIG. 7 is a characteristic diagram illustrating a result of an FFT analysis of a steering wheel torque as frequency-related data related to steering.

FIGS. 6 and 7 are each a characteristic diagram illustrating a result of an FFT analysis of the steering wheel torque as the frequency-related data related to the steering. Here, FIG. 6 represents a pattern in which high-frequency components have relatively low values and which represents a smooth steering. On the other hand, FIG. 7 represents a pattern in which high-frequency components have relatively high values and which represents a steering which is not smooth or a shaky steering. The frequency-related data (TrqFreqData) related to the steering have a greater value as the high-frequency components in the result of the FFT analysis of the steering wheel torque have higher values. Therefore, the frequency-related data (TrqFreqData) of the analysis result illustrated in FIG. 7 have a greater value than the frequency-related data (TrqFreqData) of the analysis result illustrated in FIG. 6.

Figure 9:
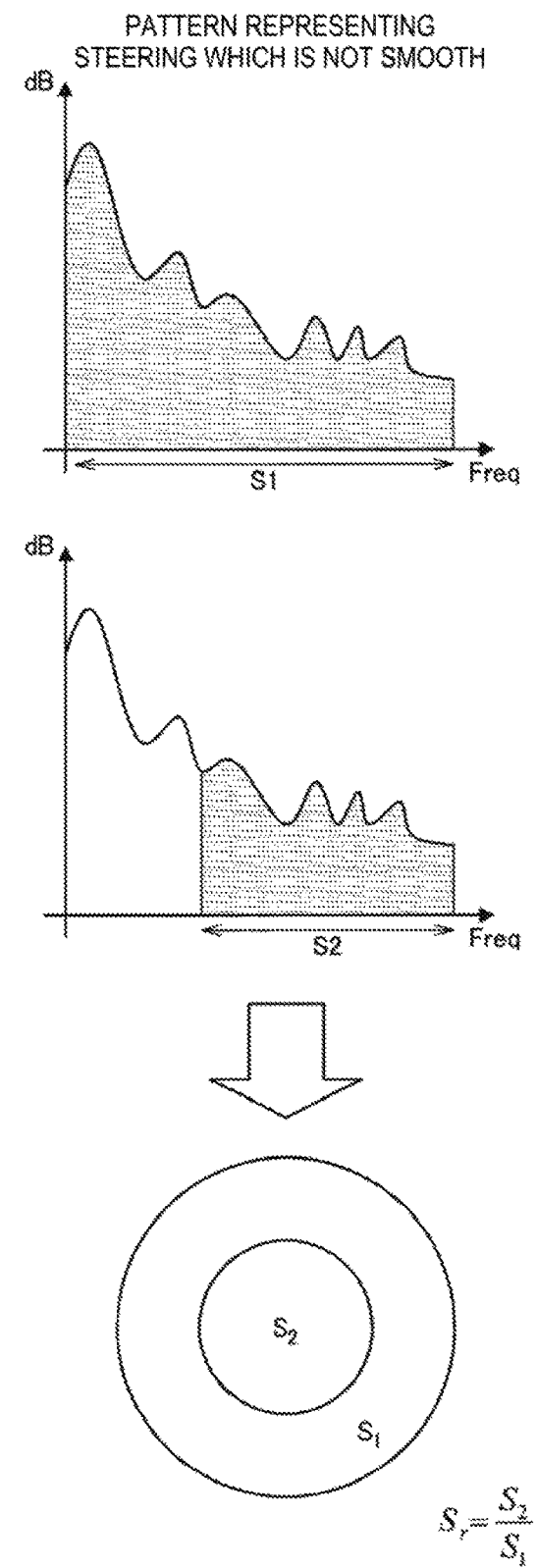
FIG. 9 is a schematic diagram illustrating an example case where a ratio Sr between an area S1 represented by a waveform resulting from the frequency analysis and an area S2 represented by a portion of the waveform over a range greater than or equal to a predetermined frequency range (TH_FREQ) is used as the frequency-related data related to the steering.

FIGS. 8 and 9 each illustrates an example case where, not simply the frequency of the steering wheel torque alone is used as the frequency-related data related to the steering, but a ratio Sr between an area S1 represented by the waveform resulting from the frequency analysis and an area S2 represented by a portion of the waveform over a range greater than or equal to a predetermined frequency range (TH_FREQ) is used as the frequency-related data related to the steering in the example of FIGS. 6 and 7. Here, FIG. 8 corresponds to FIG. 6, and FIG. 9 corresponds to FIG. 7. The frequency-related data are calculated based on the ratio between the area S1 obtained by performing an integration of the waveform resulting from the frequency analysis and the area S2 obtained by performing an integration of the portion of the waveform over the range greater than or equal to the predetermined frequency range. The ratio Sr as illustrated in each of FIGS. 8 and 9 allows a determination whether higher-frequency components are great in proportion. Accordingly, the control constant for the power steering by the power steering gain adjuster 205, and the control constant for the braking/driving force control by the steering stability controller 220, may be varied in accordance with a change in the ratio Sr.

Note that another parameter may alternatively be used as the frequency-related data related to the steering. Examples of such alternative parameters include a derivative of the steering wheel torque, a derivative of the steering wheel angle (i.e., the angular velocity of the steering wheel), and a result of a frequency analysis of the steering wheel angle. Other applicable examples of the frequency-related data related to the steering include a parameter obtained by subjecting a state quantity representing driver information to an FFT process, a parameter obtained by differentiating a state quantity representing driver information and monitoring the rate of change, a time at which a zero-crossing of a parameter representing driver information occurs, and a frequency calculated from this time. Further, a measurement of electrical activity of muscles of the driver may be used as the frequency-related data related to the steering.

Also note that an actual steering wheel torque inputted by the driver and measured by a torque sensor may be used to perform feedback control in an implementation of the present invention, and in this case, a result of a frequency analysis of the actual steering wheel torque or a derivative of the actual steering wheel torque may be used as the frequency-related data related to the steering. Note that the actual steering wheel torque may be measured by a torque sensor provided in the power steering mechanism 140. Also note that a result of a frequency analysis of a difference between a torque calculated by the steering model 205*a* and the actual steering wheel torque measured by the torque sensor, or a state quantity related to the frequency of the actual steering wheel torque, may be used as an indicator to vary the control constant for the power steering and the control constant (i.e., an inertia compensation yaw moment correction gain GainMgTrans, which will be described below) for the braking/driving force control by the steering stability controller 220.

Also note that another indicator that represents driver information other than the steering wheel torque, such as a result of a frequency analysis of the steering wheel angle or a steering speed, may be used, and the control constants may be varied based on such a parameter.

Furthermore, a vehicle motion parameter may be used in combination as an indicator to vary the control constants. For example, the control constants may be varied when an indicator that measures a turning condition of the vehicle 1000, such as the yaw rate or a lateral acceleration of the vehicle 1000, exceeds a predetermined threshold value in an implementation of the present invention. Also, the control constants may be varied using a result of a frequency analysis of an indicator that represents driver information, such as the steering wheel torque or a measurement of the electrical activity of muscles of the driver obtained by measuring equipment, in an implementation of the present invention.

The steering correction gain calculator 205*c* performs a mapping process using the acquired frequency-related data (TrqFreqData) related to the steering as an input to calculate a steering correction gain (SteerGain).

Figure 10:
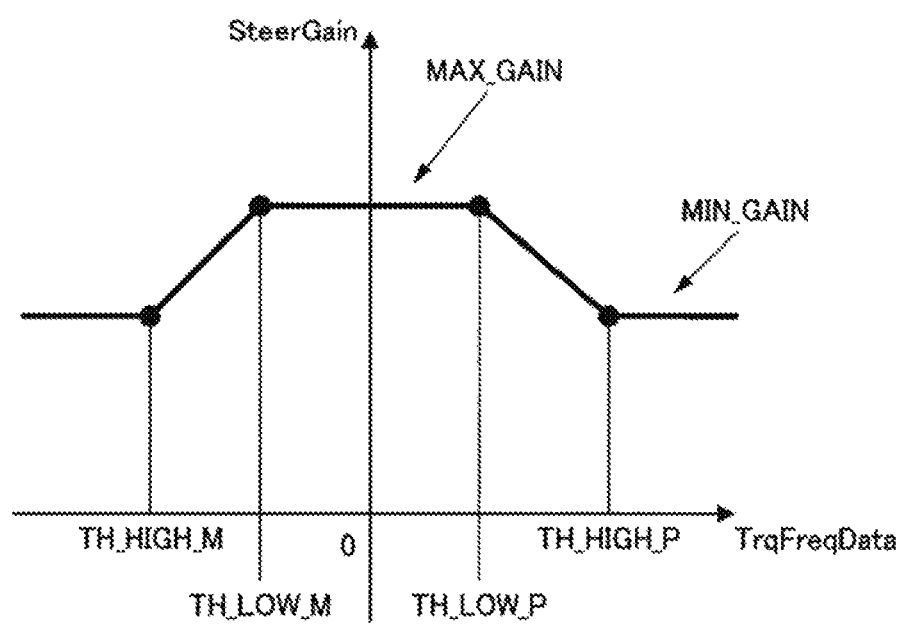
FIG. 10 is a schematic diagram illustrating a map that is used when a steering correction gain calculator calculates a steering correction gain (SteerGain)

FIG. 10 is a schematic diagram illustrating a map that is used when the steering correction gain calculator 205*c* calculates the steering correction gain (SteerGain). In FIG. 10, along the vertical axis, SteerGain (MAX_GAIN) and SteerGain (MIN_GAIN) represent a steering correction gain (on a high-gain side) and a steering correction gain (on a low-gain side), respectively. In addition, along the horizontal axis, TH_LOW_P and TH_LOW_M each represent a threshold value (on a low-frequency input side) for a change in the steering correction gain (SteerGain), and TH_HIGH_P and TH_HIGH_M each represent a threshold value (on a high-frequency input side) for a change in the steering correction gain (SteerGain). Note that the positive threshold values satisfy this relationship, TH_LOW_P<TH_HIGH_P, and the negative threshold values satisfy this relationship, TH_LOW_M>TH_HIGH_M. As illustrated in FIG. 10, values of the steering correction gain (SteerGain) between TH_LOW_P and TH_HIGH_P and between TH_LOW_M and TH_HIGH_M are calculated through linear interpolation.

Then, the steering assist amount adjuster 205*d* multiplies the reference value (δStd) of the front wheel steering angle by the steering correction gain (SteerGain) based on Eq. (3) below to calculate a requested value (δReq) of the front wheel steering angle in which the amount of assistance to be provided by the power steering has been corrected. The steering system (that is, the power steering mechanism 140) performs control of varying the front wheel steering angle, and varying the amount of assistance (e.g., the amount of steering or torque) to be provided by the power steering, based on the requested value (δReq) of the front wheel steering angle.

$$\delta Req = SteerGain \times \delta Std \qquad (3)$$

Accordingly, according to the power steering gain adjuster 205, in the case where the high-frequency components have relatively low values and the steering is smooth as illustrated in FIG. 6, the steering correction gain (SteerGain) has an increased value, resulting in an increased requested value (δReq) of the front wheel steering angle, and a turn of the vehicle is thus promoted.

Meanwhile, in the case where the high-frequency components have relatively high values and the steering is not smooth as illustrated in FIG. 7, the steering correction gain (SteerGain) has a reduced value, resulting in a reduced requested value (δReq) of the front wheel steering angle, and the degree of the turn of the vehicle is thus reduced. Accordingly, when the high-frequency components are great in proportion, the amount of steering of the front wheels is reduced, and the amount of assistance to be provided to the front wheel steering angle in accordance with the amount of a steering operation is adjusted. Accordingly, when the operation of the steering wheel is fluctuating, such as when a hunting has occurred in the operation of the steering wheel in particular, the power steering mechanism 140 reduces the change in the front wheel steering angle, and the amount of assistance (i.e., the amount of steering or torque) to be provided by the power steering mechanism 140 is reduced, resulting in increased stability of vehicle behavior.

Note that, when the frequency-related data (TrqFreqData) related to the steering have zero or near-zero values in the map of FIG. 10, a hunting or the like has not occurred in the steering, and it is not necessary to reduce the amount of assistance to be provided by the power steering. Therefore, in this case, the value of the steering correction gain (SteerGain) may be set to 1.

4. Structure of Steering Stability Controller

Meanwhile, the control target yaw rate computer 230 calculates the control target yaw rate γ_Tgt, which is used for the steering stability control, from Eq. (4) below, which represents a common two-dimensional two-wheel model. The control target yaw rate γ_Tgt corresponds to a vehicle yaw rate γ in Eq. (4), which represents the two-dimensional two-wheel model, and is calculated by substituting appropriate values into the right side of Eq. (4).

$$\gamma = \frac{1}{1 + SfTgt \times V^2} \frac{V}{l} \delta \quad (4)$$

$$\delta = \frac{\theta h}{Gh} \quad (5)$$

$$A = -\frac{m}{2l^2} \frac{l_f k_f - l_r k_r}{k_f k_r} \quad (6)$$

The variables and constants in Eqs. (4), (5), and (6) above are as follows.
<Variables>
γ: the vehicle yaw rate
V: the vehicle speed
δ: the tire steering angle (i.e., the front wheel steering angle)
θh: the steering wheel angle
<Constants>
l: the wheelbase of the vehicle
lf: the distance between the center of gravity of the vehicle and the front wheel center
lr: the distance between the center of gravity of the vehicle and a rear wheel center
m: the weight of the vehicle
Kf: cornering power (front)
Kr: cornering power (rear)
Gh: a conversion gain in conversion from the steering wheel angle to the tire steering angle (i.e., the steering gear ratio)

The control target yaw rate γ_Tgt (i.e., γ in the left side of Eq. (4)) is calculated from Eq. (4) with the vehicle speed V and the tire steering angle δ as variables. The tire steering angle δ in Eq. (4) cannot be obtained by direct sensing, and accordingly, the tire steering angle converter 230a of the control target yaw rate computer 230 calculates the tire steering angle δ by dividing the steering wheel angle θh by the conversion gain Gh based on Eq. (5). Note that the tire steering angle δ may be calculated based on the aforementioned steering model. The steering gear ratio is used as the conversion gain Gh. The target stability factor SfTgt in Eq. (4) is generally calculated from Eq. (6) as a constant A representing characteristics of the vehicle, but in the present implementation, the corrector 222 corrects the target stability factor SfTgt. The γ_Tgt computer 230b of the control target yaw rate computer 230 calculates the control target yaw rate γ_Tgt from Eq. (4) using the tire steering angle δ calculated by the tire steering angle converter 230a. The control target yaw rate γ_Tgt is inputted to the subtractor 233.

Note that the control target yaw rate γ_Tgt, which is used in the steering stability controller 220, may be calculated based on environmental information acquired from the outside recognizer(s) 170, which may be formed by a stereo camera or the like, or from an outside world recognizer, such as, for example, a navigation system. Also note that the control target yaw rate γ_Tgt may be calculated based on a state quantity which is the sum of a weighted control target yaw rate calculated from at least one of the outside recognizer 170 and the outside world recognizer and a weighted control target yaw rate γ_Tgt calculated based on the steering angle and the vehicle speed using Eq. (4).

Meanwhile, the vehicle model 224 determines the yaw rate of the vehicle 1000 through a calculation. The vehicle model 224 calculates a yaw rate model value γ_clc based on the following equations which represent a vehicle model (i.e., a two-dimensional two-wheel model) for calculating the vehicle yaw rate. More specifically, the yaw rate model value γ_clc (i.e., γ in Eqs. (7) and (8) below) is calculated by substituting the vehicle speed V and the steering wheel angle θh into Eqs. (7) and (8) and solving Eqs. (7) and (8) simultaneously. Note that Eq. (4) can be derived from Eqs. (7) and (8), and thus, the vehicle model 224 may calculate the yaw rate model value γ_clc from Eq. (4), which represents the two-dimensional two-wheel model, by a method similar to the method employed by the control target yaw rate computer 230, based on the steering wheel angle θh and the vehicle speed V.

$$mV\left(\frac{d\beta}{dt} + \gamma\right) = -2K_f\left(\beta + \frac{l_f}{V}\gamma - \delta\right) - 2K_r\left(\beta - \frac{l_r}{V}\gamma\right) \quad (7)$$

$$I\frac{d\gamma}{dt} = -2K_f l_f\left(\beta + \frac{l_f}{V}\gamma - \delta\right) + 2K_r l_r\left(\beta - \frac{l_r}{V}\gamma\right) \quad (8)$$

Note that I denotes a yaw moment of inertia of the vehicle, and β denotes the side slip angle of the vehicle.

The yaw rate model value γ_clc is inputted to the feedback yaw rate computer 232. In addition, the actual yaw rate γ, which is measured by the yaw rate sensor 150, is inputted to the feedback yaw rate computer 232.

The subtractor 228 subtracts the actual yaw rate γ from the yaw rate model value γ_clc to calculate a difference γ_diff between the yaw rate model value γ_clc and the actual yaw rate γ. The difference γ_diff is inputted to the feedback yaw rate computer 232. Here, the difference γ_diff corresponds to a parameter indicating the condition of a road surface, and the subtractor 228 therefore corresponds to a structural element that acquires a parameter indicating the condition of the road surface.

As described above, the yaw rate model value γ_clc, the actual yaw rate γ, and the difference γ_diff are inputted to the feedback yaw rate computer 232. The feedback yaw rate computer 232 calculates a weighting gain κ, which varies in accordance with the difference γ_diff between the yaw rate model value γ_clc and the actual yaw rate γ, based on the difference γ_diff. Then, the feedback yaw rate computer 232 weights both the yaw rate model value γ_clc and the actual yaw rate γ using the weighting gain κ, and calculates the feedback yaw rate γF/B based on Eq. (9) below. The calculated feedback yaw rate γF/B is inputted to the subtractor 233.

$$\gamma F/B = \kappa \times \gamma\_clc + (1-\kappa) \times \gamma \quad (9)$$

Figure 11:
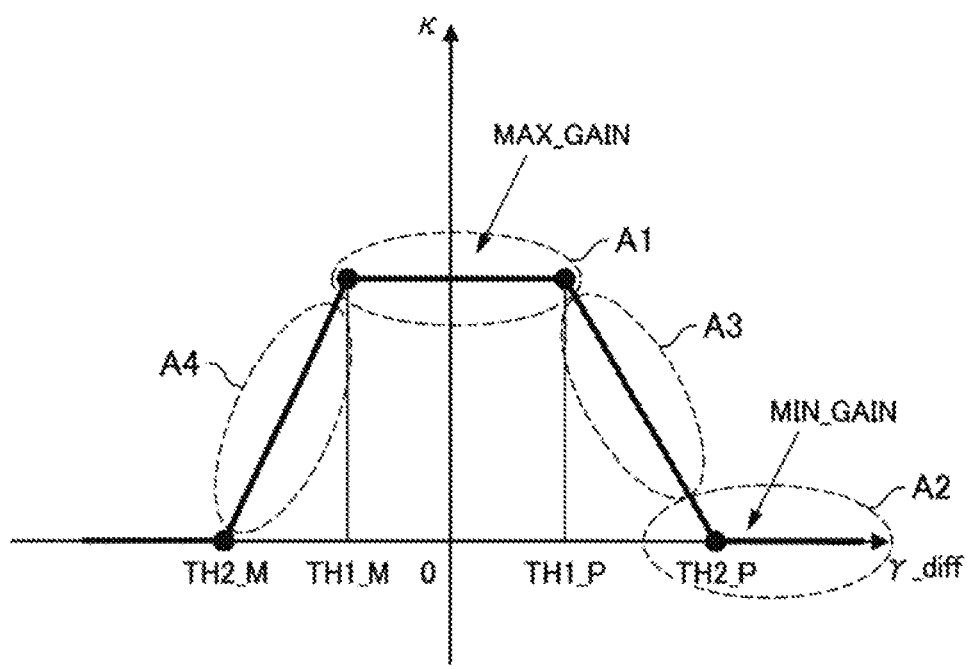
FIG. 11 is a schematic diagram illustrating a gain map used when a feedback yaw rate computer calculates a weighting gain κ.

FIG. 11 is a schematic diagram illustrating a gain map used when the feedback yaw rate computer 232 calculates the weighting gain κ. As illustrated in FIG. 11, the value of the weighting gain κ varies between 0 and 1 in accordance with the reliability of the vehicle model 224. The difference (or deviation) γ_diff between the yaw rate model value γ_clc and the actual yaw rate γ_sens is used as an indicator of the reliability of the vehicle model 224. As illustrated in FIG. 11, the gain map is set such that the value of the weighting gain κ will be greater for smaller absolute values of the difference γ_diff. The feedback yaw rate computer 232 subjects the difference γ_diff to κ mapping process of FIG. 11 to compute the weighting gain κ in accordance with the reliability of the vehicle model.

In FIG. 11, TH1_P represents a threshold value (on the positive side) for a change in the weighting gain κ, TH2_P represents a threshold value (on the positive side) for a change in the weighting gain κ, TH1_M represents a threshold value (on the negative side) for a change in the weighting gain κ, and TH2_M represents a threshold value (on the negative side) for a change in the weighting gain κ. Note that the threshold values on the positive side satisfy this relationship, TH1_P<TH2_P, and the threshold values on the negative side satisfy this relationship, TH1_M>TH2_M.

A region A1 in the gain map illustrated in FIG. 11, which is a region where the difference γ_diff approaches 0, corresponds to a region where, for example, the S/N ratio is low, or a region where tire characteristics exhibit linearity (e.g., when the road surface is dry). Therefore, in the region A1, the yaw rate model value γ_clc calculated by the vehicle model 216 has a high degree of reliability. Accordingly, the value of the weighting gain κ is determined to be 1, and the feedback yaw rate γF/B is computed using Eq. (9) with a 100% distribution of the yaw rate model value γ_clc. This eliminates an effect of noise of the yaw rate sensor 150 contained in the actual yaw rate γ, and is thus able to prevent any sensor noise from affecting the feedback yaw rate γF/B. This contributes to preventing a vibration of the vehicle 1000, leading to improved ride comfort.

In particular, drive assist control provides predictive control of the amount of a turn of the vehicle 1000 based on a future course predicted from the condition of the vehicle 1000 traveling straight ahead before entering a corner. Accordingly, not only when the vehicle 1000 makes a turn but also when the vehicle 1000 is traveling straight ahead, the effect of sensor noise is excluded to prevent vibrations of the vehicle 1000, and the vehicle 1000 is thus allowed to travel straight ahead with stability.

As described above, a region where the yaw rate model value γ_clc has a high degree of reliability can be specified based on the difference γ_diff and the driving condition. As illustrated in FIG. 11, an example coefficient setting using a map, and example correspondences between the difference γ_diff and the weighting gain κ used in the coefficient setting, are such that the value of the weighting gain κ is set to 1 when the vehicle is traveling on a dry road surface (i.e., a high μ road surface) and the amount of steering is small (e.g., when the vehicle is making a slight turn). Note that the aforementioned two-dimensional two-wheel model assumes a region where the relationship (i.e., the cornering characteristics of the tires) between the lateral accelerations and slip angles of the tires exhibits linearity. In the region where the cornering characteristics of the tires exhibit nonlinearity, the yaw rate and the lateral acceleration of the actual vehicle vary nonlinearly with the steering angle, and a significant difference occurs between the yaw rate measured on the actual vehicle and the yaw rate of the two-dimensional two-wheel model. Therefore, while use of a model that allows for nonlinearity of the tires complicates the control based on the yaw rate, the reliability of the yaw rate model value γ_clc can be easily determined based on the difference γ_diff in the present implementation.

Further, a region A2 in the gain map illustrated in FIG. 11, which corresponds to, for example, a region where the difference γ_diff has a large value, corresponds to, for example, a time when the vehicle is traveling on a wet road surface, a time when the vehicle is traveling on a snow-covered road, or a time when the vehicle is making a sharp turn, and is a marginal region in which the tires are sliding. In this region, the yaw rate model value γ_clc calculated by the vehicle model 216 has a low degree of reliability, and the difference γ_diff has a greater value. Accordingly, the value of the weighting gain κ is determined to be 0, and the feedback yaw rate γF/B is computed using Eq. (9) with a 100% distribution of the actual yaw rate γ. This contributes to ensuring sufficient precision of the feedback based on the actual yaw rate γ, allowing feedback control of the yaw rate reflecting the behavior of the actual vehicle. A turn of the vehicle 1000 can thus be optimally controlled based on the actual yaw rate γ. Moreover, in the region in which the tires are sliding, noise in a signal obtained by the yaw rate sensor 150 would not cause a vibration of the vehicle 1000 that can be perceived by the driver, and would not cause a significant reduction in ride comfort. The low μ region A2 illustrated in FIG. 11, for which the value of the weighting gain κ is determined to be 0, may be set based on design requirements, or may be experimentally determined based on steering stability performance, ride comfort, and so on when the vehicle 1000 actually travels on a low μ road surface.

Furthermore, in a region A3 in the gain map illustrated in FIG. 11, which is a transitional region (a nonlinear region) from the linear region to the marginal region, the distributions of the yaw rate model value γ_clc and the actual yaw rate γ (i.e., the value of the weighting gain κ) are linearly varied while taking into account the tire characteristics of the actual vehicle 1000 as necessary. In the transitional region from the region A1 (i.e., a high μ region) to the region A2 (i.e., a low μ region), or from the region A2 (i.e., the low μ region) to the region A1 (i.e., the high μ region), the weighting gain κ is computed using linear interpolation to avoid a torque change and a yaw rate change caused by an abrupt change in the weighting gain κ.

Furthermore, a region A4 in the gain map illustrated in FIG. 11 corresponds to a case where the actual yaw rate γ is greater than the yaw rate model value γ_clc. In the case where an incorrect parameter is inputted to the vehicle model 216, and the yaw rate model value γ_clc is calculated incorrectly, for example, the actual yaw rate γ can be used based on a map of the region A4 to perform control. Further, the actual yaw rate γ can be used based on the map of the region A4 to perform control in the case where the yaw rate model value γ_clc temporarily has a smaller value than that of the actual yaw rate γ due to a phase delay in the actual yaw rate γ that accompanies a filtering process. Note that the range of the weighting gain κ is not limited to the range of 0 to 1, and that any range of the weighting gain κ that allows vehicle control may be adopted in other implementations of the present invention without departing from the scope of the present invention.

Figure 12:
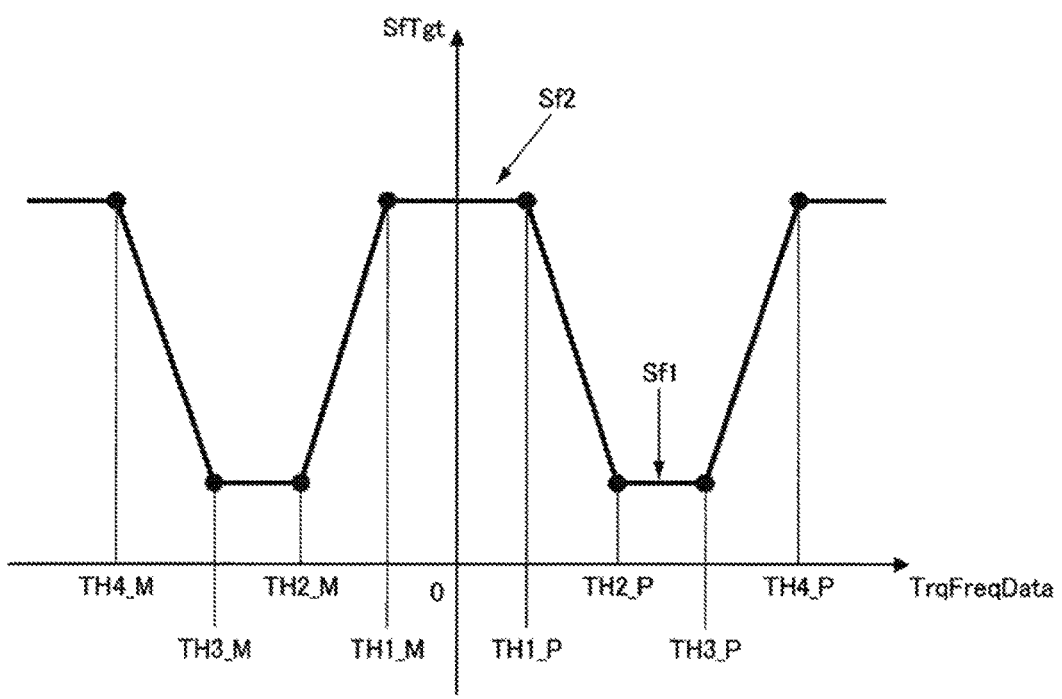
FIG. 12 is a characteristic diagram illustrating a map for correcting a target stability factor SfTgt.

The corrector 222 corrects the target stability factor SfTgt when the control target yaw rate computer 230 calculates the control target yaw rate γ_Tgt from Eqs. (4) to (6). FIG. 12 is a characteristic diagram illustrating a map for correcting the target stability factor SfTgt. As illustrated in FIG. 12, the target stability factor SfTgt, which is a parameter related to the turning performance of the vehicle, is corrected based on the frequency-related data (TrqFreqData) related to the steering. In FIG. 12, along the vertical axis, Sf1 represents a stability factor that emphasizes responsive steering to promote a rotation (i.e., yawing) of the vehicle 1000, and Sf2 represents a stability factor that emphasizes stability to ensure sufficient stability performance at the time of a turn by controlling an excessive rotation (i.e., yawing) of the vehicle 1000. Meanwhile, along the horizontal axis, TH1_P, TH2_P, TH3_P, TH4_P, TH1_M, TH2_M, TH3_M, and TH4_M each represent a threshold value for a change in the gain map, and P and M represent the positive and negative sides, respectively. As illustrated in FIG. 12, values of the target stability factor SfTgt between TH1_P and TH2_P, between TH3_P and TH4_P, between TH1_M and TH2_M, and between TH3_M and TH4_M are calculated through linear interpolation. Accordingly, when the frequency-related data (TrqFreqData) related to the steering have a value between TH1_P and TH2_P, between TH3_P and TH4_P, between TH1_M and TH2_M, or between TH3_M and TH4_M, the value of SfTgt is calculated with distributions of Sf1 and Sf2 in accordance with the degree of divergence from each threshold value.

The corrector 222 corrects the value of the target stability factor SfTgt in accordance with the change in the frequency-related data (TrqFreqData) related to the steering, which are calculated from an indicator related to the ease of steering, to increase or reduce an output of the braking/driving force control by the steering stability controller 220. This compensates for an increase or reduction in the amount of assistance caused in accordance with the requested value (δReq) of the front wheel tire steering angle by the power steering gain adjuster 205.

As illustrated in FIG. 12, if the absolute value of the frequency-related data (TrqFreqData) is greater than the absolute value of a predetermined threshold value (TH1_P or TH1_M), the value of the target stability factor SfTgt is shifted toward Sf1 (on an OS side), which emphasizes responsive steering, based on the frequency-related data (TrqFreqData) related to the steering. This increases the value of the control target yaw rate γ_Tgt, which is calculated from Eq. (4), and thus increases a target value of the braking/driving force control by the steering stability controller 220. Therefore, when the frequency-related data (TrqFreqData) have a large absolute value, the requested value (δReq) of the front wheel tire steering angle is made lower than the reference value (δStd) in accordance with the map of FIG. 10, but the value of the control target yaw rate γ_Tgt is increased, and thus, a reduction in the amount of assistance (i.e., the amount of steering or torque) to be provided by the power steering can be compensated for through simultaneous performance of the steering control by the power steering and the braking/driving force control by the steering stability controller 220.

Meanwhile, if the absolute value of the frequency-related data (TrqFreqData) is smaller than the absolute value of the predetermined threshold value (TH1_P or TH1_M), the value of the target stability factor SfTgt is shifted toward Sf2 (on a US side), which emphasizes the stability, based on the frequency-related data (TrqFreqData) related to the steering. This decreases the value of the control target yaw rate γ_Tgt, which is calculated from Eq. (4), and thus decreases a turning target value of the braking/driving force control by the steering stability controller 220. Therefore, when the frequency-related data (TrqFreqData) have a large absolute value, the steering control by the power steering and the braking/driving force control by the steering stability controller 220 are simultaneously controlled so as to decrease the requested value (δReq) of the front wheel tire steering angle in accordance with the map of FIG. 10, and also to decrease the value of the control target yaw rate γ_Tgt, in order to prevent an excessive turn of the vehicle.

As described above, the target stability factor SfTgt is corrected based on the frequency-related data (TrqFreqData) related to the steering, so that when the steering is being performed with a low frequency, the control target yaw rate γ_Tgt is calculated to have a value corresponding to a normal amount of a turn, while when the steering is being performed with a high frequency, the control target yaw rate γ_Tgt is calculated to have a value greater than or equal to the value corresponding to the normal amount of the turn to promote the turn of the vehicle. The target stability factor SfTgt is thus corrected based on the frequency-related data to compute an optimum value of the control target yaw rate γ_Tgt in accordance with the condition of the steering.

In particular, the target stability factor SfTgt in Eq. (4) is a value that is determined in accordance with the specifications of the vehicle 1000 as is apparent from Eq. (6), and is a parameter that physically represents steering stability characteristics of the vehicle 1000. Therefore, when the control target yaw rate γ_Tgt is controlled, the target stability factor SfTgt is corrected and is thus controlled to accomplish a more natural behavior of the vehicle and a smooth turn of the vehicle.

Note that, as illustrated in FIG. 12, if the absolute value of the frequency-related data (TrqFreqData) related to the steering is greater than the absolute value of a predetermined threshold value (TH3_P or TH3_M), the value of the target stability factor SfTgt is shifted toward Sf2. When the frequency-related data (TrqFreqData) represent an excessively high frequency, the control amount of the driving force control by the steering stability controller 220 may become excessively large, and the value of the target stability factor SfTgt may thus be shifted toward Sf2 to prevent an excessive turn of the vehicle 1000. This is an example of shifting of SfTgt in accordance with the condition of the steering and the driving condition.

To the subtractor 233, the control target yaw rate γ_Tgt is inputted from the control target yaw rate computer 230, and the feedback yaw rate γF/B is inputted from the feedback yaw rate computer 232. The subtractor 233 subtracts the feedback yaw rate γF/B from the control target yaw rate γ_Tgt to calculate a difference Δγ_Tgt (i.e., the amount of yaw rate correction) between γ_Tgt and γF/B. That is, the difference Δγ_Tgt is calculated from Eq. (10) below.

$$\Delta\gamma\_Tgt = \gamma\_Tgt - \gamma F/B \qquad (10)$$

The difference Δγ_Tgt is outputted to the control target yaw moment computer 250.

The control target yaw moment computer 250 calculates a yaw moment to correct the vehicle behavior based on the difference Δγ_Tgt. The control target yaw moment computer 250 calculates the control target yaw moment using the difference Δγ_Tgt, and corrects the control target yaw moment using an adjustment gain to combine ensuring of stability when the steering wheel is being operated with a low frequency and turn assist control when the steering wheel is being operated with a high frequency, and controls the steering stability performance from the standpoint of both transient behavior and steady-state behavior at the time of a turn of the vehicle. Accordingly, the control target yaw moment computer 250 includes the damping control yaw moment computer (i.e., a steady-state term calculator) 250a, which calculates a "target damping yaw moment MgDampTgt", which is a parameter for a convergence of the yaw rate of the vehicle 1000, and the inertia compensation yaw moment computer (i.e., a transient term computer) 250b, which calculates a "target inertia compensation yaw moment MgTransTgt", which is a parameter for correcting the yaw moment of inertia of the vehicle 1000.

The damping control yaw moment computer (i.e., the steady-state term calculator) 250a multiplies Δγ_Tgt by a coefficient D1 (i.e., a damping yaw moment computation coefficient) to compute the "target damping yaw moment MgDampTgt" to improve convergence performance at the time of the turn of the vehicle. The coefficient D1 is a coefficient by which the yaw rate is multiplied in Eq. (11) below, in which a well-known two-dimensional two-wheel model (yawing) is arranged with respect to the yaw moment.

$$2l_f K_f \frac{\theta h}{Gh} = 2\,(l_f K_f - l_r K_r)\beta + I\frac{d}{dt}\gamma + \frac{2}{V}(l_f^2 K_f + l_r^2 K_r)\gamma \qquad (11)$$

That is, the target damping yaw moment MgDampTgt is calculated from Eq. (12) below.

$$MgDampTgt = D1 \times \Delta\gamma\_Tgt \qquad (12)$$

The target damping yaw moment MgDampTgt corresponds to a basic amount of a damping yaw moment used in the driving force control. Here, the coefficient D1 corresponds to $2/V(lf2Kf+lr2Kr)$, by which γ is multiplied in Eq. (11). The "target damping yaw moment MgDampTgt" serves to stabilize the vehicle behavior with respect to, in particular, the steady-state behavior of the vehicle 1000.

Meanwhile, the inertia compensation yaw moment computer (i.e., the transient term computer) 250b multiplies a derivative of Δγ_Tgt by a coefficient T1 (i.e., an inertia compensation yaw moment computation coefficient) to compute a basic amount MgTransBasis of the "target inertia compensation yaw moment MgTransTgt" to correct the yaw moment of inertia at the time of the turn of the vehicle. The coefficient T1 is a coefficient by which a yaw acceleration is multiplied in Eq. (11), in which the well-known two-dimensional two-wheel model (yawing) is arranged with respect to the yaw moment. That is, the basic amount MgTransBasis is calculated from Eq. (13) below. The basic amount MgTransBasis corresponds to a basic amount of an inertia compensation yaw moment used in the driving force control. Here, the coefficient T1 corresponds to 1 (i.e., the yaw moment of inertia of the vehicle), by which dγ/dt is multiplied in Eq. (11). At this time, the inertia compensation yaw moment computer (i.e., the transient term computer) 250b corrects the basic amount MgTransBasis by multiplying the basic amount MgTransBasis of the "target inertia compensation yaw moment MgTransTgt" by a gain that is set in accordance with the frequency-related data (TrqFreqData) related to the steering to calculate the "target inertia compensation yaw moment MgTransTgt". Thus, the "target inertia compensation yaw moment MgTransTgt" serves to stabilize the vehicle behavior with respect to, in particular, momentary behavior of the vehicle 1000.

$$MgTransBasis = T1 \times \frac{d}{dt}(\Delta\gamma\_Tgt) \qquad (13)$$

In more detail, the inertia compensation yaw moment computer 250b has a function of calculating the gain GainMgTrans for correcting the inertia compensation yaw moment, and of varying the gain GainMgTrans in accordance with the frequency-related data (TrqFreqData) related to the steering. In addition, based on the frequency-related data (TrqFreqData) related to the steering, the inertia compensation yaw moment computer 250b determines the degree of stability of the vehicle behavior with respect to the steering, and calculates the correction gain GainMgTrans, which has a function of limiting an output of the inertia compensation yaw moment when the steering wheel is being operated with a high frequency. Moreover, when it is determined that the steering of the steering wheel has shifted into a high-frequency range, the gain is reduced to a negative value, and a transient inverse yaw moment is added to ensure sufficient stability performance of the vehicle 1000. Meanwhile, when the steering has been performed with a higher-frequency input, or when it is determined that a marginal region has been reached, a transient inverse yaw moment is not added to avoid an excessive reduction in the turning performance, and control is performed to maintain sufficient turning performance of the vehicle 1000 even in a high-frequency region.

As described above, the inertia compensation yaw moment computer 250b calculates the gain GainMgTrans for correcting the basic amount MgTransBasis of the target inertia compensation yaw moment MgTransTgt in accordance with the value of the frequency-related data (TrqFreqData) related to the steering. Thus, in accordance with the steering inputs, responsivity of the vehicle 1000 is emphasized when low-frequency inputs are predominant, such as when a gentle steering is being performed, while when high-frequency inputs are predominant, such as when the steering is shaky, an inverse yaw moment is added to ensure sufficient stability performance of the vehicle. Thus, convergence performance of the control for, in particular, high-frequency steering inputs can be improved.

Accordingly, the inertia compensation yaw moment computer 250b first multiplies the derivative of Δγ_Tgt by the coefficient T1 to calculate the basic amount MgTransBasis. The inertia compensation yaw moment computer 250b then multiplies the calculated basic amount MgTransBasis by the inertia compensation yaw moment correction gain GainMgTrans, which varies in accordance with the frequency-related data (TrqFreqData) related to the steering, to calculate the target inertia compensation yaw moment MgTransTgt.

Figure 13:
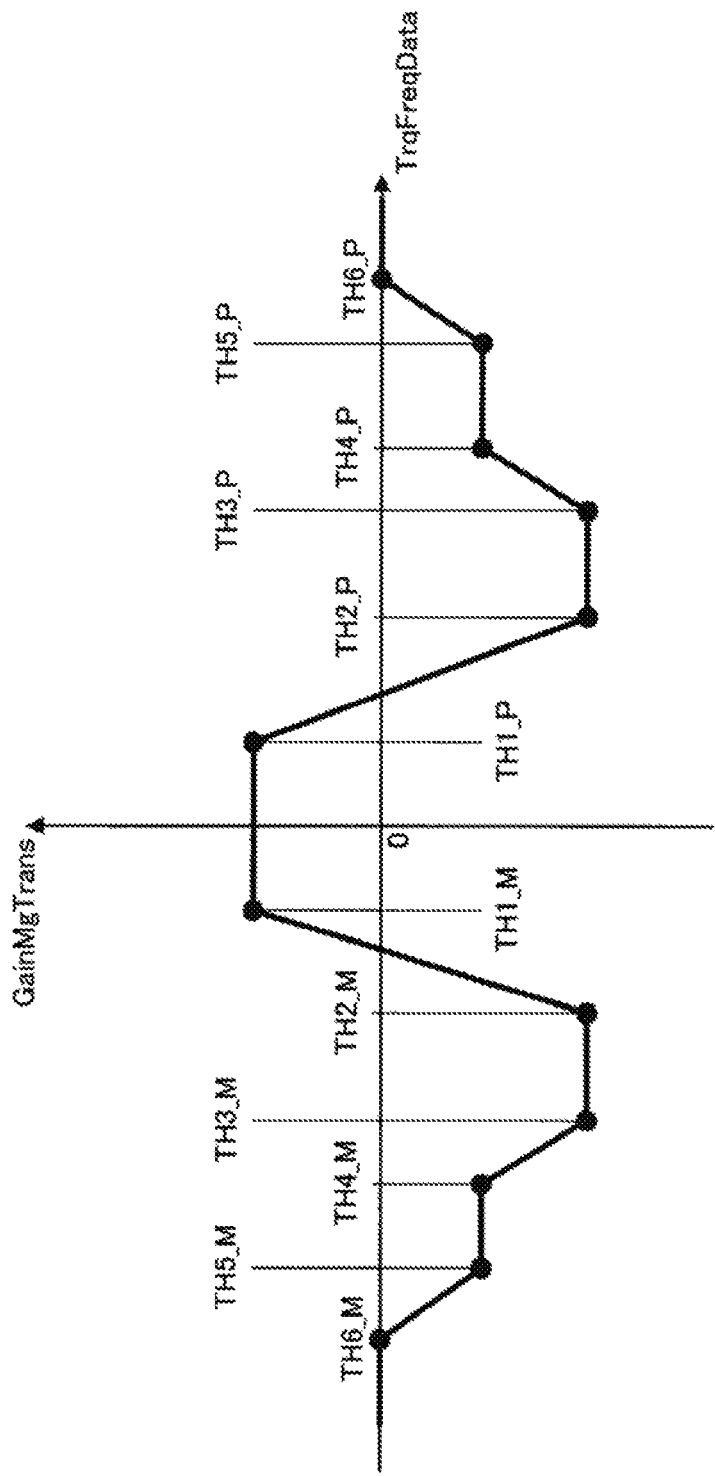
FIG. 13 is a characteristic diagram illustrating a map for calculating an inertia compensation yaw moment correction gain GainMgTrans.

FIG. 13 is a characteristic diagram illustrating a map for calculating the inertia compensation yaw moment correction gain GainMgTrans. In FIG. 13, TH1_P, TH2_P, TH3_P, TH4_P, TH5_P, TH6_P, TH1_M, TH2_M, TH3_M, TH4_M, TH5_M, and TH6_M, each represent a threshold value for a change in the gain map, and P and M represent the positive and negative sides, respectively.

As illustrated in FIG. 13, if the value of the frequency-related data (TrqFreqData) related to the steering becomes sufficiently greater than TH1_P, the inertia compensation yaw moment correction gain GainMgTrans comes to have a negative value, which reduces the value of the control target yaw moment MgTgt, which is the sum of the target damping yaw moment MgDampTgt and the target inertia compensation yaw moment MgTransTgt. This leads to a value of the control target yaw moment MgTgt that serves to prevent an excessive turn of the vehicle.

Moreover, if the value of the frequency-related data (TrqFreqData) related to the steering becomes greater than TH3_P, and it is determined that a higher-frequency steering input has been made or that the marginal region has been reached, the value of the inertia compensation yaw moment correction gain GainMgTrans is made closer to 0 (neutral) without adding an inverse yaw moment. Thus, control of maintaining sufficient turning performance of the vehicle 1000 even in a high-frequency region by avoiding an excessively reduction in the turning performance is performed.

Note that the map of FIG. 13 is merely an example, and that any value that allows control of the vehicle, including 0 and negative values, can be set as a value of the inertia compensation yaw moment correction gain GainMgTrans.

As described above, when the frequency-related data (TrqFreqData) related to the steering have a large value, and a high-frequency hunting or a shaky steering has occurred, the vehicle behavior can be stabilized by reducing the hunting or the shaky steering by reducing a transient motion of the vehicle 1000. Accordingly, an inverse yaw moment is added with a negative value of the inertia compensation yaw moment correction gain GainMgTrans to reduce the transient motion of the vehicle to stabilize the vehicle behavior.

In the above-described example, a transient term (i.e., the target inertia compensation yaw moment MgTransTgt) included in the control target yaw moment of the braking/driving force control by the steering stability controller 220 is corrected. Note, however, that, in another implementation of the present invention, a steady-state term (e.g., the target damping yaw moment MgDampTgt) included in the control target yaw moment of the braking/driving force control may be multiplied by a gain based on a result of a frequency analysis of the steering wheel torque, the steering wheel angle, or the like to specify a control constant for improving convergence performance for high-frequency steering inputs. The target damping yaw moment MgDampTgt may be corrected to correct steady-state turning performance of the vehicle 1000 for relatively gentle turns.

After the target damping yaw moment MgDampTgt and the target inertia compensation yaw moment MgTransTgt are calculated as described above, the adder 250c in the control target yaw moment computer 250 adds up the target damping yaw moment MgDampTgt and the target inertia compensation yaw moment MgTransTgt to calculate the control target yaw moment MgTgt to be used in the steering stability control. That is, the control target yaw moment MgTgt is calculated from Eq. (14) below.

$$MgTgt = MgDampTgt + MgTransTgt \quad (14)$$

The control target yaw moment MgTgt calculated by the control target yaw moment computer 250 is inputted to the required motor torque computer 280. The required motor torque computer 280 calculates the required motor torque based on the control target yaw moment MgTgt.

Figure 14:
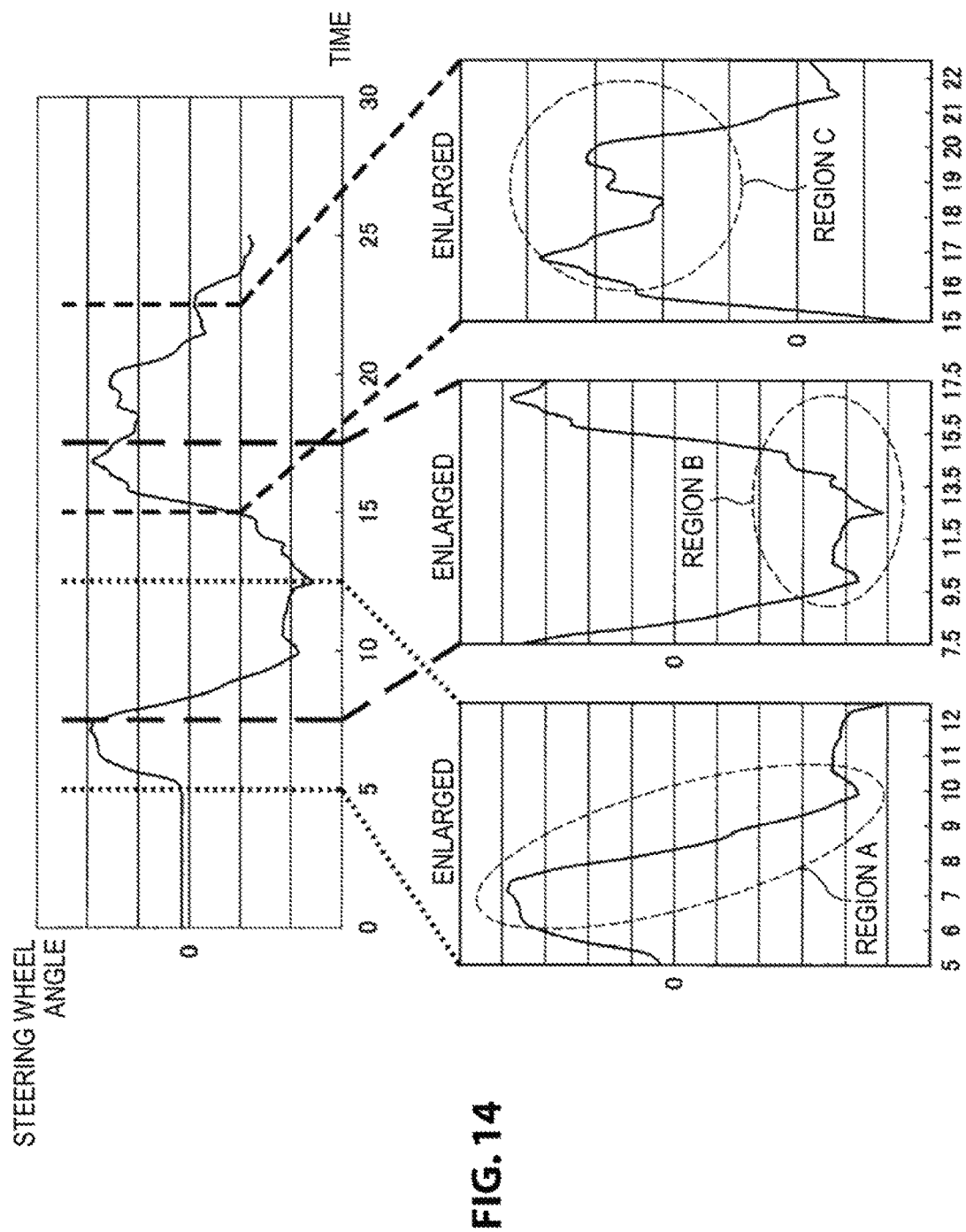
FIG. 14 is a schematic diagram for explaining control amounts and vehicle behaviors when control according to an implementation of the present invention is performed.

5. Control Amounts and Vehicle Behaviors when Control According to Present Implementation is Performed Next, with reference to FIGS. 14 to 26, the control amounts and vehicle behaviors when the control according to the present implementation is performed will now be described below. First, a situation in which the steering is shaky will be described with reference to FIGS. 14 to 24. Here, changes in various control amounts obtained by simulations when an operation of a steering wheel of a vehicle as illustrated in FIG. 14 is performed with a constant vehicle speed will be described. In each of FIGS. 14 to 24, the same time domain is adopted along the horizontal axis. In addition, in each of FIGS. 14 to 24, regions which represent portions of the whole characteristics in an enlarged form for the sake of convenience in description are illustrated below the characteristic diagram.

In each of FIGS. 15 to 24 and FIG. 26, a solid line represents a characteristic (the present implementation) in the case where both the control by the power steering gain adjuster 205 and the control by the steering stability controller 220 according to the present implementation are performed. In addition, a broken line represents a characteristic (comparative example 2) in the case where only the control by the power steering gain adjuster 205 is performed. In addition, a dot-dashed line represents a characteristic (comparative example 1) in the case where the corrections of the control amounts are not performed either in the control by the power steering gain adjuster 205 or the control by the steering stability controller 220. FIG. 27 is a schematic diagram illustrating the steering wheel torque, the amount of motor control by the steering stability controller, the steering angle, and the amount of a turn of the vehicle with respect to each of the present implementation, comparative example 1, and comparative example 2 for comparison therebetween. As illustrated in FIG. 27, in the present implementation and comparative example 2, both the steering wheel torque and the steering angle are reduced by the control by the power steering gain adjuster 205 when, in particular, a high-frequency operation of the steering wheel is being performed. In addition, in the present implementation, the control amount by the control by the steering stability controller 220 is increased. In addition, in comparative example 2, the control by only the power steering gain adjuster 205 (i.e., a reduction in output in response to a high-frequency input) is performed, and accordingly, the amount of the turn of the vehicle 1000 is reduced compared to the steering by the driver. In the present implementation, both the control by the power steering gain adjuster 205 and the control by the steering stability controller 220 are performed, and the amount of the turn of the vehicle 1000 is accordingly maintained for the steering by the driver of the vehicle 1000.

Figure 15:
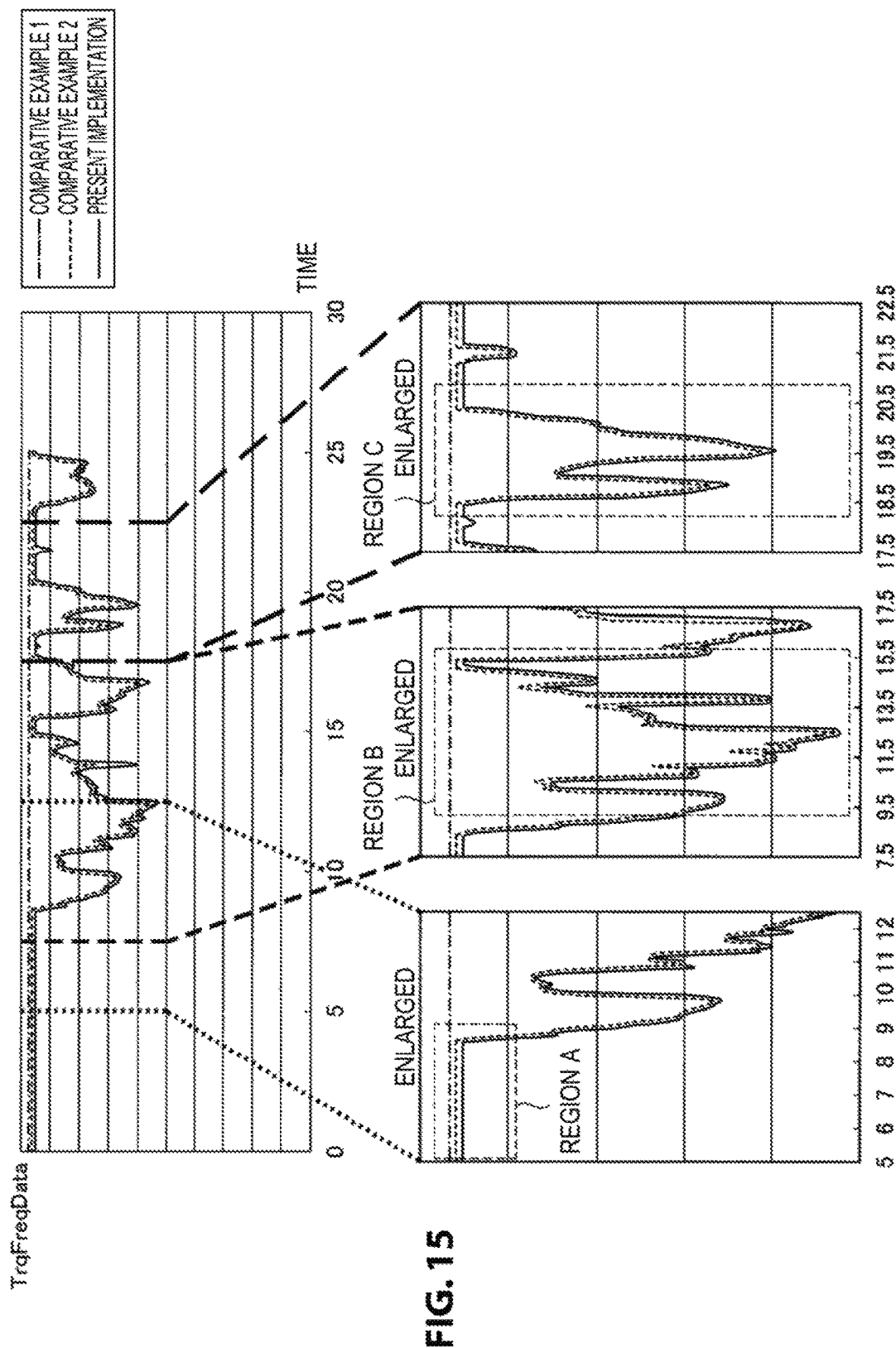
FIG. 15 is a schematic diagram for explaining control amounts and vehicle behaviors when control according to an implementation of the present invention is performed.

FIG. 15 illustrates the value of the frequency-related data (TrqFreqData) related to the steering. In the characteristic representing the operation of the steering wheel illustrated in FIG. 14, the steering wheel is operated in a smooth manner in the region A, and the operation of the steering wheel is shaky (or irregular) in the regions B and C. In this case, as illustrated in FIG. 15, in a situation corresponding to the region A in FIG. 14 and in which the operation of the steering wheel is smooth, the frequency-related data (TrqFreqData) related to the steering have a constant value (here, a value of "1" as an example), and the amount of assistance to be provided by the power steering mechanism 140 is not increased, and normal control is performed, in each of the three characteristics.

Meanwhile, in the characteristic representing the operation of the steering wheel illustrated in FIG. 14, the operation of the steering wheel is shaky (or irregular) in the regions B and C. In this case, as illustrated in FIG. 15, in situations corresponding to the regions B and C in FIG. 14 and in which the operation of the steering wheel is shaky, the amount of the steering operation is corrected, and the frequency-related data (TrqFreqData) related to the steering have a value less than or equal to 1 in each of the characteristics represented by the solid line (the present implementation) and the broken line. In contrast, in the characteristic represented by the dot-dashed line, the frequency-related data (TrqFreqData) related to the steering have a constant value of "1" because the control by the power steering gain adjuster 205 is not performed.

Figure 16:
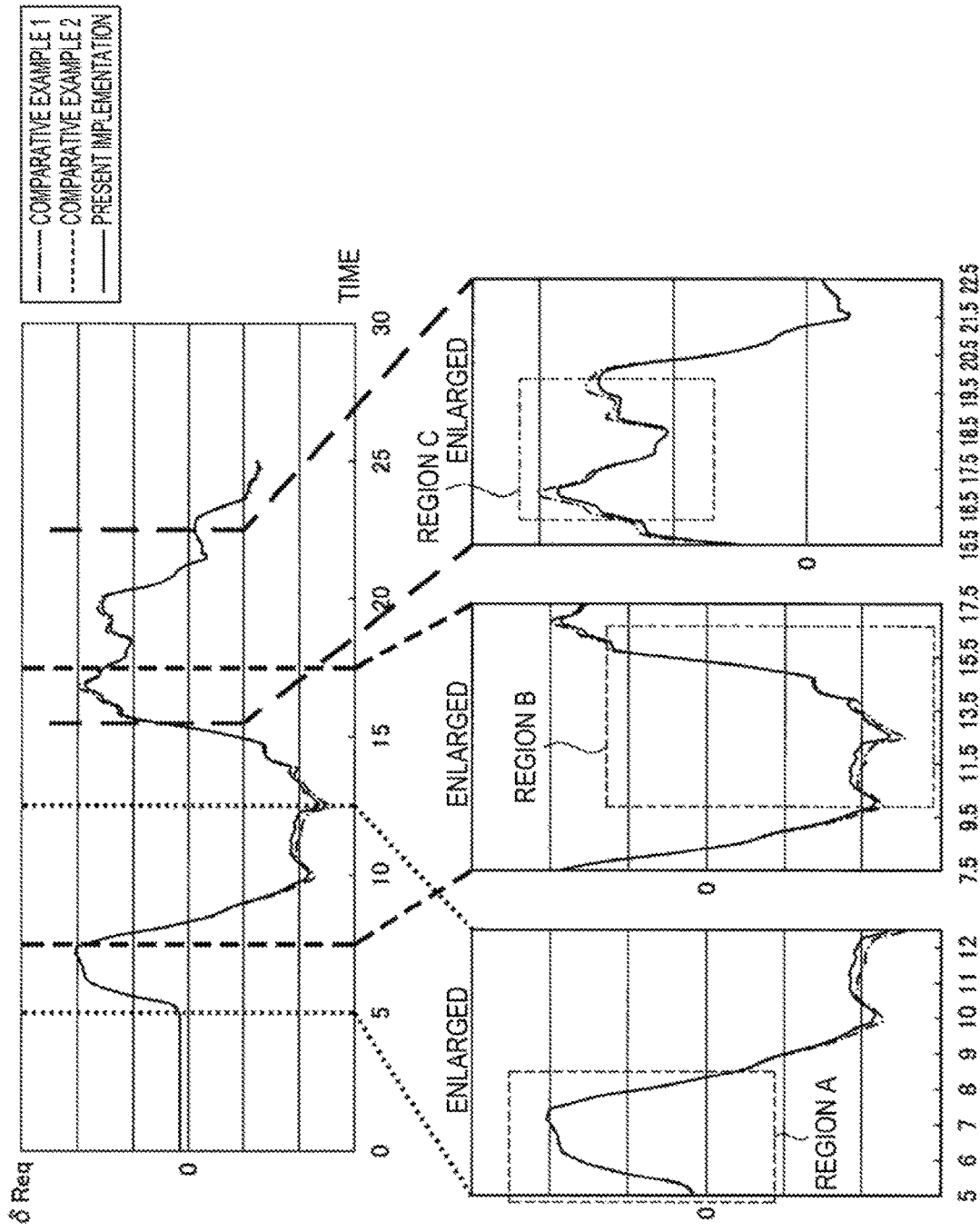
FIG. 16 is a schematic diagram for explaining control amounts and vehicle behaviors when control according to an implementation of the present invention is performed.

FIG. 16 illustrates the requested value (δReq) of the front wheel steering angle. In the situation corresponding to the region A in FIG. 14 and in which the operation of the steering wheel is smooth, the frequency-related data (TrqFreqData) have a constant value of "1" as illustrated in FIG. 15, and accordingly, normal control is performed without reducing the amount of assistance to be provided by the power steering. Meanwhile, in the situations corresponding to the regions B and C in FIG. 14 and in which the operation of the steering wheel is shaky, the requested value (δReq) of the front wheel steering angle is reduced in accordance with the value of the frequency-related data (TrqFreqData) related to the steering in each of the characteristics represented by the solid line and the broken line when compared to the case of the characteristic represented by the dot-dashed line. The steering of the front wheels can thus be reduced when the steering is shaky.

Figure 17:
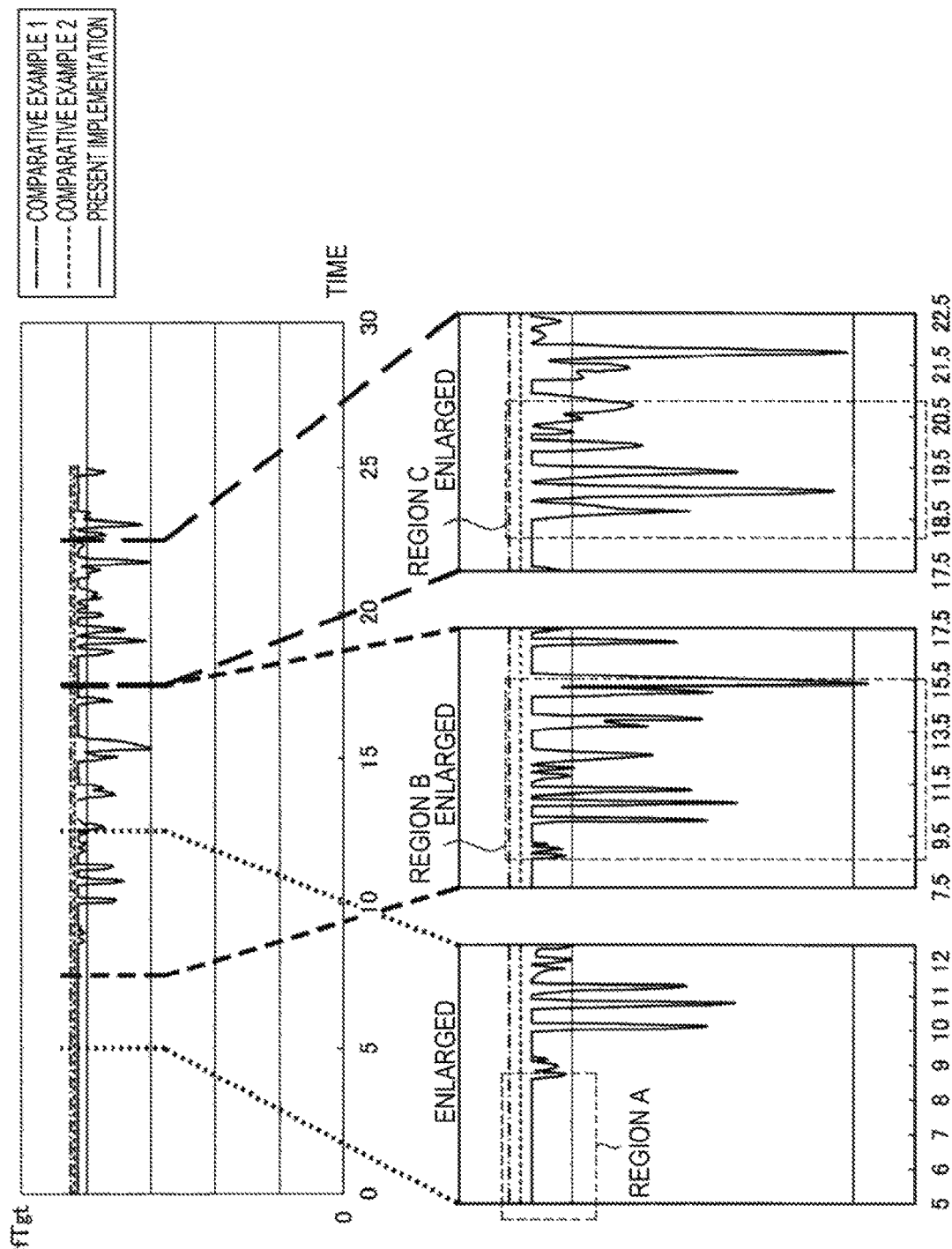
FIG. 17 is a schematic diagram for explaining control amounts and vehicle behaviors when control according to an implementation of the present invention is performed.

FIG. 17 illustrates the target stability factor SfTgt. In the situation corresponding to the region A in FIG. 14 and in which the operation of the steering wheel is smooth, the target stability factor SfTgt is not corrected, and normal control is performed, in the characteristic represented by the solid line. In addition, in each of the characteristics represented by the broken line and the dot-dashed line, the target stability factor SfTgt is not corrected, maintaining a constant value, and normal control is accordingly performed. Meanwhile, in the situations corresponding to the regions B and C in FIG. 14 and in which the operation of the steering wheel is shaky, the target stability factor SfTgt is corrected in the characteristic represented by the solid line. The target stability factor SfTgt maintains a constant value in each of the characteristics represented by the broken line and the dot-dashed line.

Figure 18:
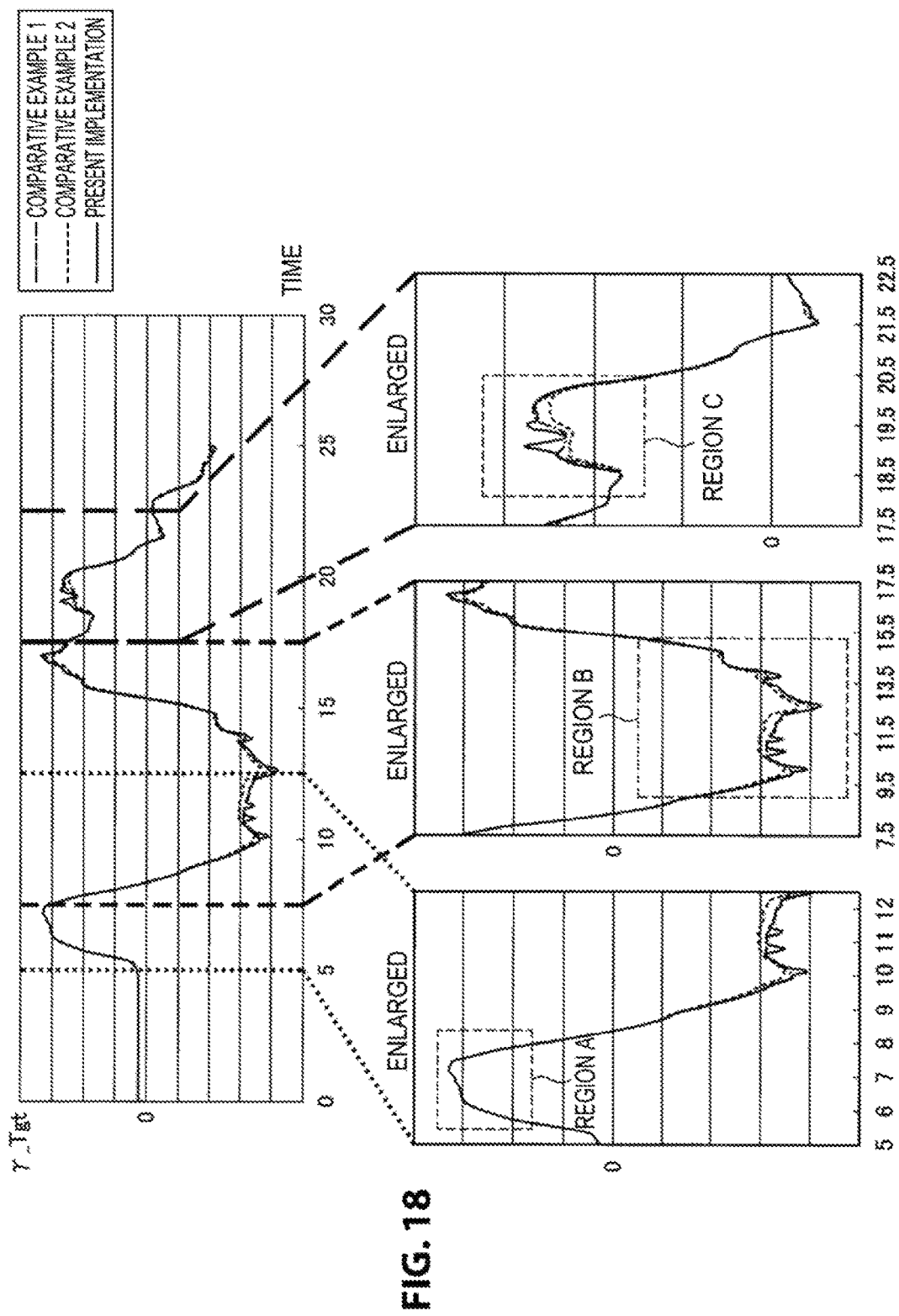
FIG. 18 is a schematic diagram for explaining control amounts and vehicle behaviors when control according to an implementation of the present invention is performed.

FIG. 18 illustrates the control target yaw rate $\gamma\_Tgt$. In the situation corresponding to the region A in FIG. 14 and in which the operation of the steering wheel is smooth, the target stability factor SfTgt has the same value in each of the characteristics represented by the solid line, the broken line, and the dot-dashed line, and the control target yaw rate $\gamma\_Tgt$ accordingly has the same value, and normal control is performed, in each of the characteristics. Meanwhile, in the situations corresponding to the regions B and C in FIG. 14 and in which the operation of the steering wheel is shaky, the target stability factor SfTgt is corrected, and the absolute value of the control target yaw rate $\gamma\_Tgt$ is accordingly increased, in the characteristic represented by the solid line. In each of the characteristics represented by the broken line and the dot-dashed line, the target stability factor SfTgt maintains the constant value. It is therefore apparent that the absolute value of the control target yaw rate $\gamma\_Tgt$ is increased to promote a turn of the vehicle in the characteristic represented by the solid line when compared to the cases of the characteristics represented by the broken line and the dot-dashed line.

Figure 19:
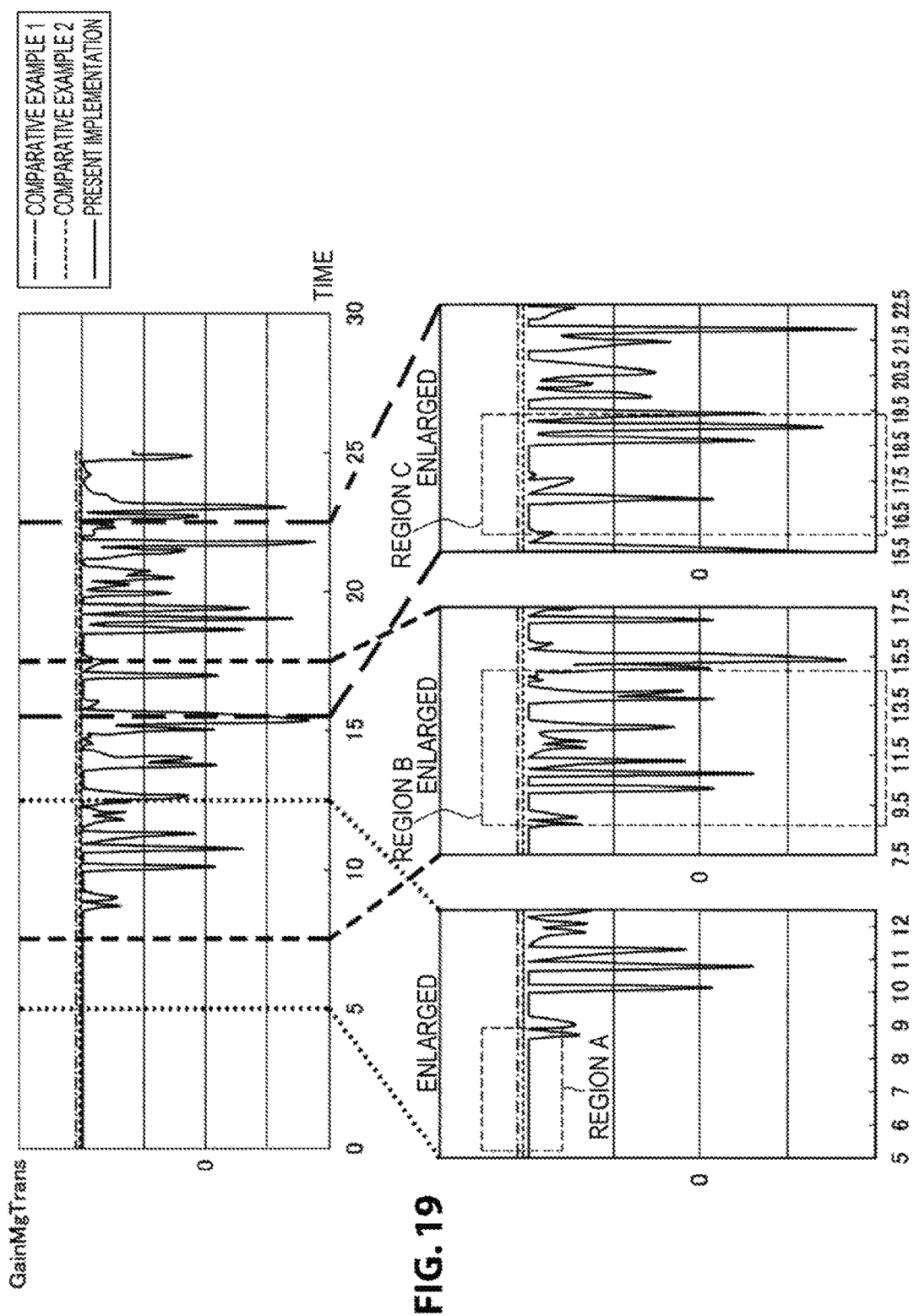
FIG. 19 is a schematic diagram for explaining control amounts and vehicle behaviors when control according to an implementation of the present invention is performed.

FIG. 19 illustrates the inertia compensation yaw moment correction gain GainMgTrans. In the situation corresponding to the region A in FIG. 14 and in which the operation of the steering wheel is smooth, the gain GainMgTrans is not corrected in the characteristic represented by the solid line. In each of the characteristics represented by the broken line and the dot-dashed line, the gain GainMgTrans always maintains a constant value. Therefore, the gain GainMgTrans has the same value in each of the characteristics represented by the solid line, the broken line, and the dot-dashed line. Meanwhile, in the situations corresponding to the regions B and C in FIG. 14 and in which the operation of the steering wheel is shaky, the gain GainMgTrans is corrected, and the value thereof is reduced even to a negative value, in the characteristic represented by the solid line, while the value of the gain GainMgTrans is not corrected in each of the characteristics represented by the broken line and the dot-dashed line.

Figure 20:
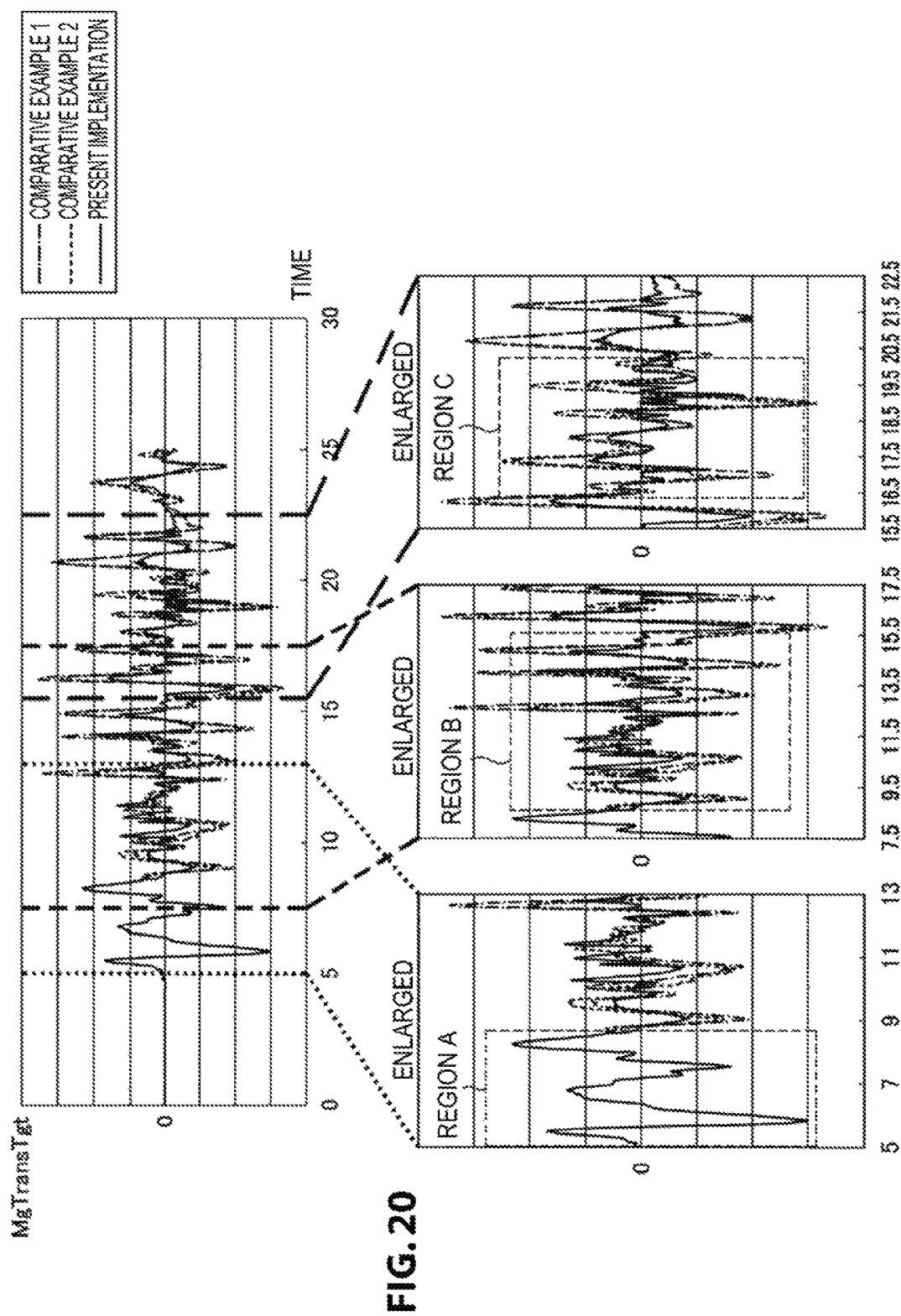
FIG. 20 is a schematic diagram for explaining control amounts and vehicle behaviors when control according to an implementation of the present invention is performed.

FIG. 20 illustrates the target inertia compensation yaw moment MgTransTgt. In the situation corresponding to the region A in FIG. 14 and in which the operation of the steering wheel is smooth, the gain GainMgTrans is not corrected in the characteristic represented by the solid line. Therefore, in each of the characteristics represented by the solid line, the broken line, and the dot-dashed line, normal control is performed, and the value of the target inertia compensation yaw moment MgTransTgt is substantially the same. Meanwhile, in the situations corresponding to the regions B and C in FIG. 14 and in which the operation of the steering wheel is shaky, in the characteristic represented by the solid line, the gain GainMgTrans is gradually varied from positive values to negative values in accordance with the inputs, and a transient control yaw moment is reduced, or a transient inverse yaw moment is added, to reduce the absolute value of the target inertia compensation yaw moment MgTransTgt, when compared to the characteristics represented by the broken line and the dot-dashed line. Sufficient stability performance of the vehicle 1000 can thus be ensured.

Figure 21:
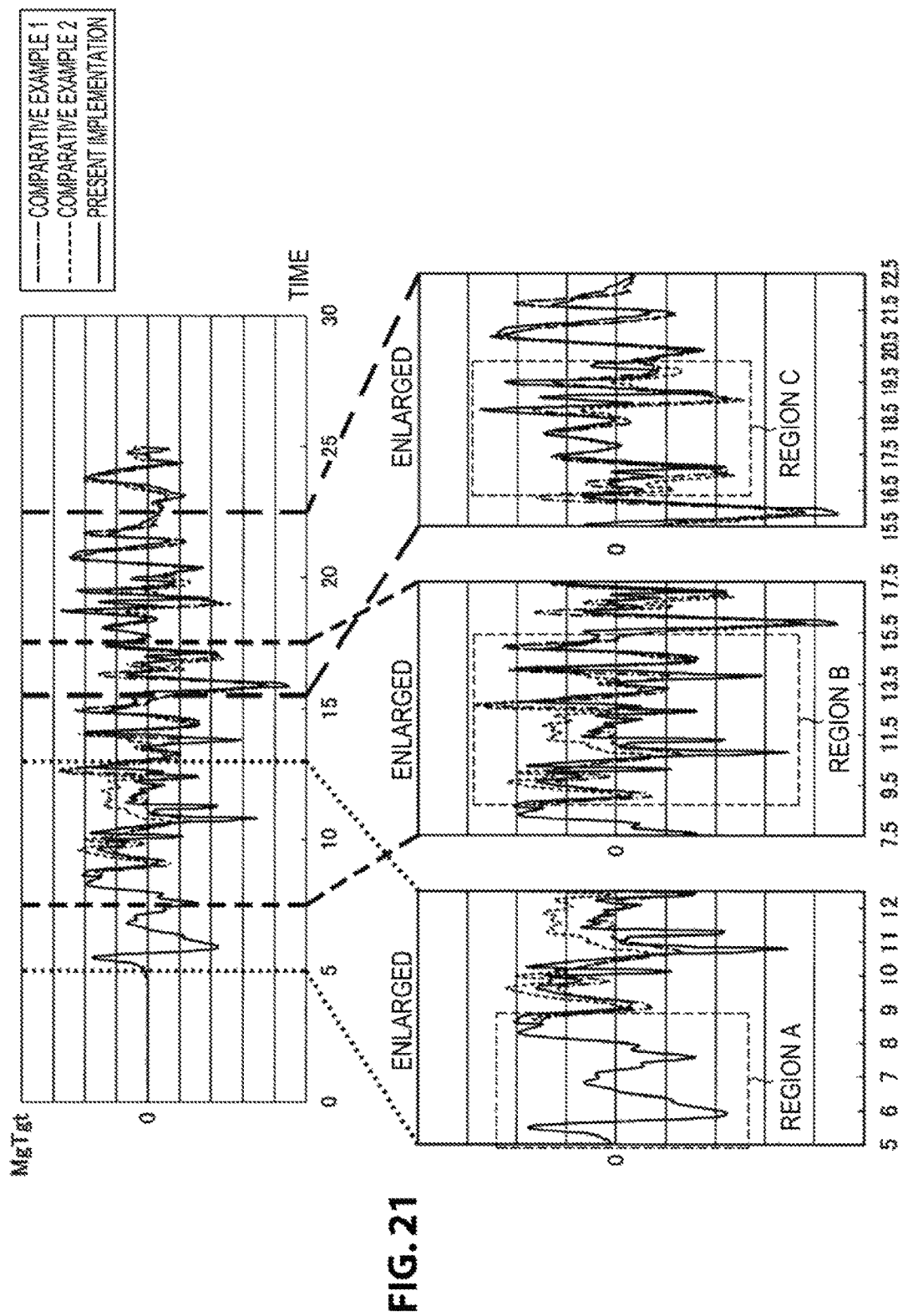
FIG. 21 is a schematic diagram for explaining control amounts and vehicle behaviors when control according to an implementation of the present invention is performed.

FIG. 21 illustrates the control target yaw moment MgTgt. In the situation corresponding to the region A in FIG. 14 and in which the operation of the steering wheel is smooth, the inertia compensation yaw moment correction gain GainMgTrans is not corrected in the characteristic represented by the solid line. Therefore, in each of the characteristics represented by the solid line, the broken line, and the dot-dashed line, normal control is performed, and the value of the control target yaw moment MgTgt is substantially the same. Meanwhile, in the situations corresponding to the regions B and C in FIG. 14 and in which the operation of the steering wheel is shaky, in the characteristic represented by the solid line, a transient inverse yaw moment is added to reduce the absolute value of the control target yaw moment MgTgt when compared to the characteristics represented by the broken line and the dot-dashed line. Sufficient stability performance of the vehicle 1000 can thus be ensured.

Figure 22:
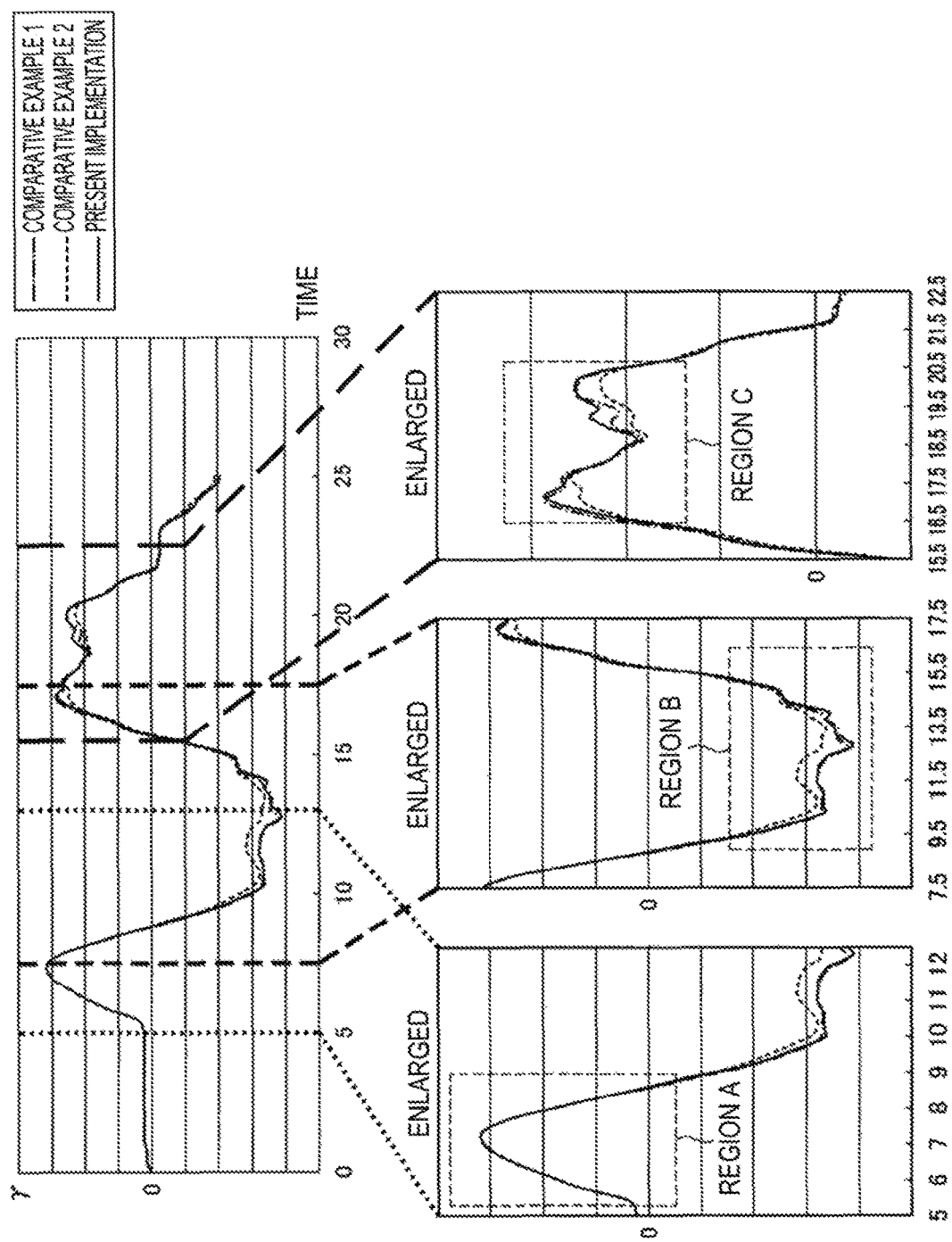
FIG. 22 is a schematic diagram for explaining control amounts and vehicle behaviors when control according to an implementation of the present invention is performed.

FIG. 22 illustrates the actual yaw rate of the vehicle 1000. In the situation corresponding to the region A in FIG. 14 and in which the operation of the steering wheel is smooth, the actual yaw rate has substantially the same value in each of the characteristics represented by the solid line, the broken line, and the dot-dashed line. Meanwhile, in the situations corresponding to the regions B and C in FIG. 14 and in which the operation of the steering wheel is shaky, in the characteristic represented by the broken line, the amount of assistance provided by the power steering is reduced, so that a shaky steering may become easily avoidable, when compared to the case of the characteristic represented by the dot-dashed line, but the driving course of the vehicle 1000 for a given amount of the steering operation will change, leading to an uncomfortable feeling of the driver. In contrast, in the situations corresponding to the regions B and C in FIG. 14 and in which the operation of the steering wheel is shaky, it is apparent in the characteristic represented by the solid line that a shaky steering can be reduced, that a driving course equivalent to that of the characteristic represented by the dot-dashed line can be ensured, and that a deviated driving course caused by the steering control and an uncomfortable feeling of or a burden on the driver can be reduced.

Figure 23:
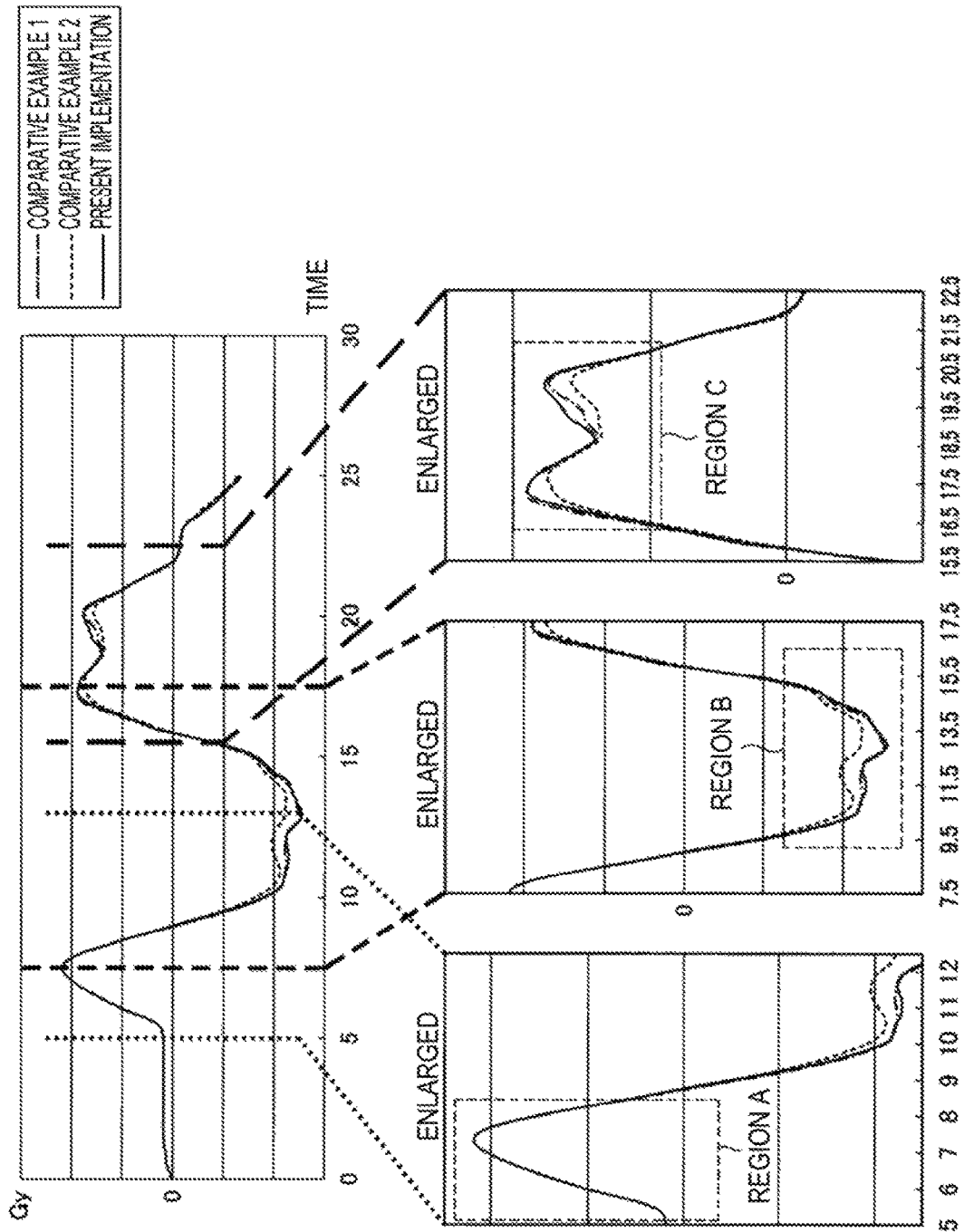
FIG. 23 is a schematic diagram for explaining control amounts and vehicle behaviors when control according to an implementation of the present invention is performed.

FIG. 23 illustrates the lateral acceleration (Gy) of the vehicle 1000. In the situation corresponding to the region A in FIG. 14 and in which the operation of the steering wheel is smooth, the lateral acceleration has equivalent values in each of the characteristics represented by the solid line, the broken line, and the dot-dashed line. Meanwhile, in the situations corresponding to the regions B and C in FIG. 14 and in which the operation of the steering wheel is shaky, in the characteristic represented by the broken line, the amount of assistance provided by the power steering is reduced, so that a shaky steering may become easily avoidable, when compared to the case of the characteristic represented by the dot-dashed line, but the driving course of the vehicle 1000 for a given amount of the steering operation will change, leading to an uncomfortable feeling of the driver. In contrast, in the situations corresponding to the regions B and C in FIG. 14 and in which the operation of the steering wheel is shaky, it is apparent in the characteristic represented by the solid line that a shaky steering can be reduced, that a driving course equivalent to that of the characteristic represented by the dot-dashed line can be ensured, and that a deviated driving course caused by the steering control and an uncomfortable feeling of or a burden on the driver can be reduced.

Figure 24:
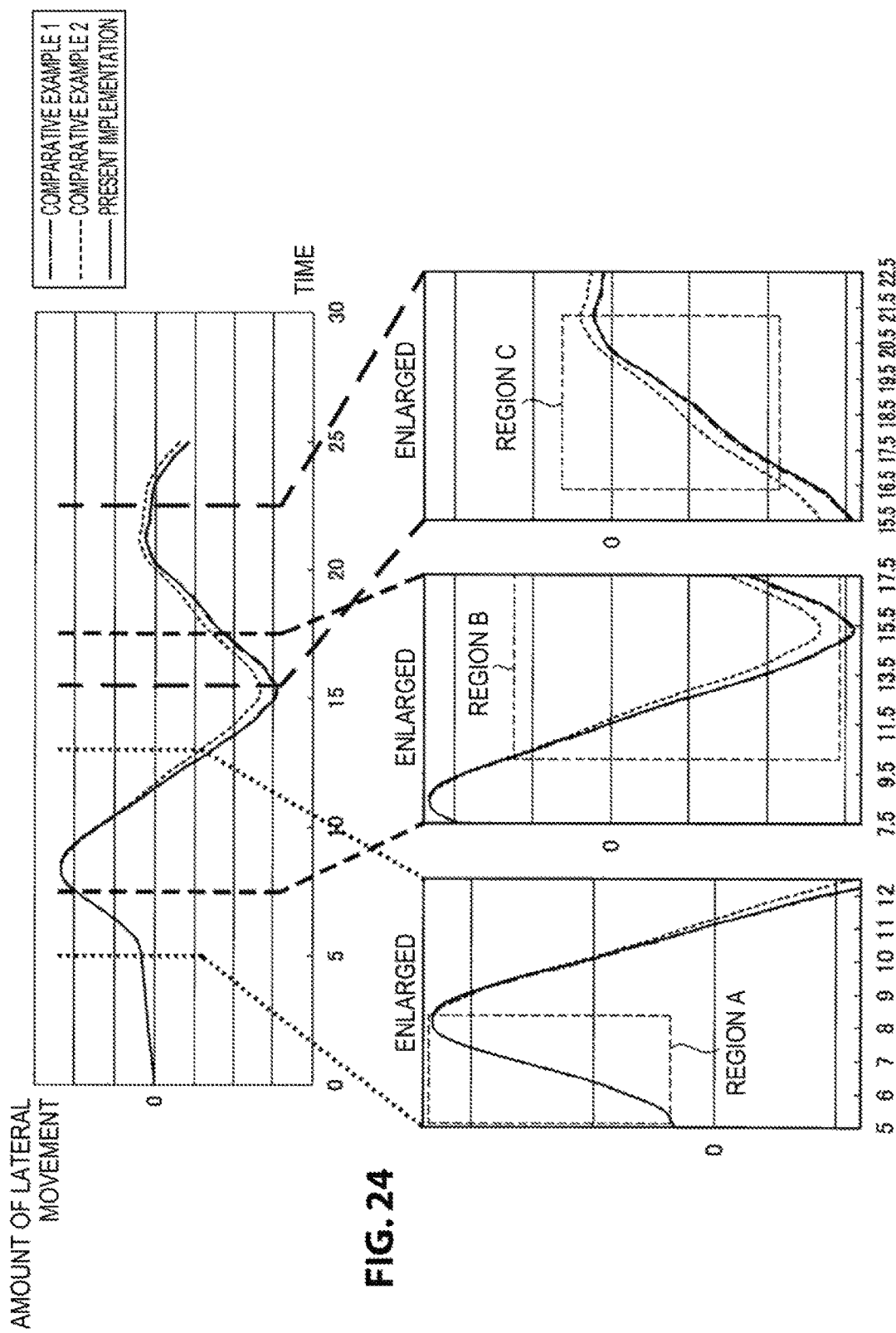
FIG. 24 is a schematic diagram for explaining control amounts and vehicle behaviors when control according to an implementation of the present invention is performed.

FIG. 24 illustrates the amount of lateral movement of the vehicle 1000. In the situation corresponding to the region A in FIG. 14 and in which the operation of the steering wheel is smooth, the amount of lateral movement has equivalent values in each of the characteristics represented by the solid line, the broken line, and the dot-dashed line. Meanwhile, in the situations corresponding to the regions B and C in FIG. 14 and in which the operation of the steering wheel is shaky, in the characteristic represented by the broken line, the amount of assistance provided by the power steering is reduced, so that a shaky steering may become easily avoidable, when compared to the case of the characteristic represented by the dot-dashed line, but the driving course of the vehicle 1000 for a given amount of the steering operation will change, and the absolute value of the amount of lateral movement is reduced, leading to an uncomfortable feeling of the driver. In contrast, in the situations corresponding to the regions B and C in FIG. 14 and in which the operation of the steering wheel is shaky, it is apparent in the characteristic represented by the solid line that a shaky steering can be reduced, that a driving course equivalent to that of the characteristic represented by the dot-dashed line can be ensured, and that a deviated driving course caused by the steering control and an uncomfortable feeling of or a burden on the driver can be reduced.

Next, a situation in which the steering is not shaky will now be described below with reference to FIGS. 25 and 26. Here, how the control amounts (i.e., the actual yaw rate γ, the lateral acceleration Gy, and the amount of lateral movement) as illustrated in FIG. 26 vary when the steering wheel is operated in a manner as illustrated in FIG. 25 with a constant vehicle speed will be described. In each of FIGS. 25 and 26, the same time domain is adopted along the horizontal axis. In FIG. 26, a solid line represents a characteristic in the case where both the control by the power steering gain adjuster 205 and the control by the steering stability controller 220 according to the present implementation are performed. A broken line represents a characteristic in the case where only the control by the power steering gain adjuster 205 is performed. A dot-dashed line represents a characteristic in the case where neither the control by the power steering gain adjuster 205 nor the control by the steering stability controller 220 is performed.

In the situation in which the steering is not shaky, neither the control by the power steering gain adjuster 205 nor the control by the steering stability controller 220 is performed in the characteristic represented by the solid line as in the region A in FIG. 14. Moreover, the control by the power steering gain adjuster 205 is not performed in the characteristic represented by the broken line. Therefore, in FIG. 26, each of the control amounts (i.e., the actual yaw rate γ, the lateral acceleration Gy, and the amount of lateral movement) exhibits substantially the same variation in each of the characteristics represented by the solid line, the broken line, and the dot-dashed line. Therefore, the control according to the present implementation as represented by the solid line is able to achieve stable vehicle behavior and a sufficient amount of lateral movement even in the situation in which the steering is not shaky.

Although the preferred implementations of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. A vehicle comprising:
   a power steering; and
   a controller configured to:
   adjust an amount of an assistance in a steering to be provided by the power steering, wherein the amount of the assistance is adjusted in accordance with a change in a state quantity related to an ease of the steering, wherein the state quantity is frequency-related data related to a steering input by a driver of the vehicle;
   control a control amount of a driving force on a wheel of the vehicle in accordance with the change in the state quantity;
   calculate a target yaw rate of the vehicle based on a vehicle model that defines a relationship between the target yaw rate of the vehicle and a vehicle speed and a steering wheel angle with a target stability factor, wherein the target stability factor is a parameter, related to a turning performance of the vehicle, determined from specifications of the vehicle,
   wherein the target stability factor comprises a first stability factor, a second stability factor greater than the first stability factor, and a third stability factor calculated with linear interpolation between the first stability factor and the second stability factor;
vary the turning performance of the vehicle by:
  when an absolute value of the frequency-related data is smaller than or equal to a first threshold value, setting the first stability factor as the target stability factor,
  when the absolute value of the frequency-related data is greater than or equal to a second threshold value, setting the second stability factor as the target stability factor, and
  when the absolute value of the frequency-related data is greater than the first threshold value and smaller than the second threshold value, setting the third stability factor as the target stability factor;
compare the frequency-related data with a threshold value;
determine whether the target stability factor should be corrected or not, based on a result of the comparison of the frequency-related data with the threshold value;
correct the target stability factor based on the determination that the target stability factor should be corrected; and
control the vehicle based on the target yaw rate.

2. The vehicle according to claim 1,
wherein the frequency-related data is obtained, by subjecting one of a steering wheel torque and an amount of a steering operation of the driver to a frequency analysis, from a change in one of a first rate of change in the steering wheel torque caused by the driver and a second rate of change in the amount of the steering operation by the driver.

3. The vehicle according to claim 1,
wherein the controller is further configured to cause the amount of the assistance to decrease as high-frequency components included in the frequency-related data increase.

4. The vehicle according to claim 1,
wherein the controller is further configured to cause the target yaw rate to increase as a value of the target stability factor decreases.

5. The vehicle according to claim 4,
wherein the controller is further configured to:
  acquire, as a yaw rate generated by the vehicle, a feedback yaw rate to be compared with the target yaw rate;
  calculate a control target yaw moment based on a first difference between the target yaw rate and the feedback yaw rate;
  calculate the control target yaw moment by adding up a steady-state damping control yaw moment and a transient inertia compensation yaw moment, wherein each of the steady-state damping control yaw moment and the transient inertia compensation yaw moment is calculated based on the first difference; and
  correct at least one of the steady-state damping control yaw moment and the transient inertia compensation yaw moment based on the frequency-related data.

6. The vehicle according to claim 5,
wherein the controller is further configured to:
  acquire a first yaw rate obtained from the vehicle model and a second yaw rate obtained from a yaw rate sensor; and
  calculate the feedback yaw rate, based on the first yaw rate and the second yaw rate, with an increased distribution of the first yaw rate when a second difference between the first yaw rate and the second yaw rate is small and an increased distribution of the second yaw rate when the second difference is large.

7. The vehicle according to claim 5,
wherein the controller is further configured to cause a value of the transient inertia compensation yaw moment to decrease as high-frequency components included in the frequency-related data increase.

8. The vehicle according to claim 1,
wherein the controller is further configured to:
  acquire, as a yaw rate generated by the vehicle, a feedback yaw rate to be compared with the target yaw rate;
  calculate a control target yaw moment based on a first difference between the target yaw rate and the feedback yaw rate;
  calculate the control target yaw moment by adding up a steady-state damping control yaw moment and a transient inertia compensation yaw moment, wherein each of the steady-state damping control yaw moment and the transient inertia compensation yaw moment is calculated based on the first difference; and
  correct at least one of the steady-state damping control yaw moment and the transient inertia compensation yaw moment based on the frequency-related data.

9. The vehicle according to claim 8,
wherein the controller is further configured to cause a value of the transient inertia compensation yaw moment to decrease as high-frequency components included in the frequency-related data increase.

10. The vehicle according to claim 9,
wherein the controller is further configured to cause a value of the transient inertia compensation yaw moment to decrease as high-frequency components included in the frequency-related data increase.

11. The vehicle according to claim 8,
wherein the controller is further configured to:
  acquire a first yaw rate obtained from the vehicle model and a second yaw rate obtained from a yaw rate sensor; and
  calculate the feedback yaw rate, based on the first yaw rate and the second yaw rate, with an increased distribution of the first yaw rate when a second difference between the first yaw rate and the second yaw rate is small and an increased distribution of the second yaw rate when the second difference is large.

12. A vehicle comprising:
a power steering, and
a controller configured to:
  adjust an amount of an assistance in a steering to be provided by the power steering, wherein the amount of the assistance is adjusted in accordance with a change in a state quantity related to an ease of the steering, wherein the state quantity is frequency-related data related to a steering input by a driver of the vehicle;
  control a control amount of a driving force on a wheel of the vehicle in accordance with the change in the state quantity;
  cause the amount of the assistance to decrease as high-frequency components included in the frequency-related data increase;
  calculate a reference value of a front wheel steering angle and a steering wheel torque based on a steering model;

calculate the frequency-related data based on:
a result of a frequency analysis of at least one of the steering wheel torque and an amount of a steering operation by the driver, or
at least one of a change in a first rate of change in the steering wheel torque and a change in a second rate of change in the amount of the steering operation;
calculate a steering correction gain for correcting the reference value of the front wheel steering angle based on the frequency-related data;
multiply the reference value of the front wheel steering angle by the steering correction gain;
calculate a requested value of the front wheel steering angle based on the multiplication of the reference value of the front wheel steering angle by the steering correction gain; and
output the requested value of the front wheel steering angle to the power steering,
wherein the controller is further configured to calculate the frequency-related data based on a ratio between a first area obtained by a first integration of a waveform resulting from the frequency analysis, and a second area obtained by a second integration of a portion of the waveform over a range greater than or equal to a predetermined frequency range.

13. The vehicle according to claim 12,
wherein the frequency-related data is obtained, by subjecting one of the steering wheel torque and the amount of the steering operation of the driver to the frequency analysis, from the change in one of the first rate of change in the steering wheel torque caused by the driver and the second rate of change in the amount of the steering operation by the driver.

14. A method for controlling a vehicle, the method comprising:
adjusting an amount of an assistance in a steering to be provided by a power steering of the vehicle, wherein the amount of the assistance is adjusted in accordance with a change in a state quantity related to an ease of the steering, wherein the state quantity is frequency-related data related to a steering input by a driver of the vehicle;
controlling a control amount of a driving force on a wheel of the vehicle in accordance with the change in the state quantity,
wherein the controlling the control amount includes:
calculating a target yaw rate of the vehicle based on a vehicle model that defines a relationship between the target yaw rate of the vehicle and a vehicle speed and a steering wheel angle with a target stability factor, wherein the target stability factor is a parameter, related to a turning performance of the vehicle, determined from specifications of the vehicle,
wherein the target stability factor comprises a first stability factor, a second stability factor greater than the first stability factor, and a third stability factor calculated with linear interpolation between the first stability factor and the second stability factor;
varying the turning performance of the vehicle by:
when an absolute value of the frequency-related data is smaller than or equal to a first threshold value, setting the first stability factor as the target stability factor,
when the absolute value of the frequency-related data is greater than or equal to a second threshold value, setting the second stability factor as the target stability factor, and
when the absolute value of the frequency-related data is greater than the first threshold value and smaller than the second threshold value, setting the third stability factor as the target stability factor;
comparing the frequency-related data with a threshold value;
determining whether the target stability factor should be corrected or not, based on a result of the comparison of the frequency-related data with the threshold value; and
correcting the target stability factor based on the determination that the target stability factor should be corrected; and
controlling the vehicle based on the corrected target stability factor.

15. A method for controlling a vehicle, the method comprising:
adjusting an amount of an assistance in a steering to be provided by a power steering of the vehicle, wherein the amount of the assistance is adjusted in accordance with a change in a state quantity related to an ease of the steering;
controlling a control amount of a driving force on a wheel of the vehicle in accordance with the change in the state quantity,
wherein the state quantity is frequency-related data related to a steering input by a driver of the vehicle,
wherein, in the adjusting the amount of the assistance, the amount of the assistance is decreased as high-frequency components included in the frequency-related data increase, and
wherein the adjusting the amount of the assistance includes:
calculating a reference value of a front wheel steering angle and a steering wheel torque based on a steering model,
calculating the frequency-related data based on:
a frequency analysis of at least one of the steering wheel torque and an amount of a steering operation by the driver, or
at least one of a change in a first rate of change in the steering wheel torque and a change in a second rate of change in the amount of the steering operation;
calculating a steering correction gain for correcting the reference value of the front wheel steering angle based on the frequency-related data;
multiplying the reference value of the front wheel steering angle by the steering correction gain; and
calculating a requested value of the front wheel steering angle based on the multiplication of the reference value of the front wheel steering angle by the steering correction gain; and
outputting the requested value of the front wheel steering angle to the power steering; and
controlling the power steering of the vehicle based on the requested value of the front wheel steering angle,
wherein the frequency-related data is further calculated based on a ratio between a first area obtained by a first integration of a waveform resulting from the frequency analysis, and a second area obtained by a second integration of a portion of the waveform over a range greater than or equal to a predetermined frequency range.

\* \* \* \* \*